(12) United States Patent
Nagata et al.

(10) Patent No.: US 6,743,090 B2
(45) Date of Patent: Jun. 1, 2004

(54) VEHICLE AIR CONDITIONER WITH ROTARY DOOR

(75) Inventors: Osamu Nagata, Ichinomiya (JP); Yoshihiro Goto, Anjo (JP); Kazuma Inagaki, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/315,559

(22) Filed: Dec. 9, 2002

(65) Prior Publication Data
US 2003/0111208 A1 Jun. 19, 2003

(30) Foreign Application Priority Data

Dec. 11, 2001 (JP) ........................................ 2001-376998
Dec. 26, 2001 (JP) ........................................ 2001-393920
Jul. 24, 2002 (JP) ........................................ 2002-215232

(51) Int. Cl.$^7$ ................................................ B60H 3/00
(52) U.S. Cl. ........................ 454/156; 454/159; 454/126
(58) Field of Search ........................ 237/12.3 B, 12.3 R, 237/12.3 A; 165/41, 42; 62/239

(56) References Cited

U.S. PATENT DOCUMENTS

| | | | | |
|---|---|---|---|---|
| 5,062,352 A | * | 11/1991 | Ostrand | ...................... 454/121 |
| 5,564,979 A | * | 10/1996 | Sumiya et al. | .............. 454/121 |
| 6,029,739 A | | 2/2000 | Izawa et al. | |

* cited by examiner

Primary Examiner—Derek S. Boles
(74) Attorney, Agent, or Firm—Harness, Dickey & Pierce, PLC

(57) ABSTRACT

In an air conditioning unit of a vehicle air conditioner, an air-outlet mode switching portion is provided at an upper side of a heat exchanging portion including at least a heating heat exchanger for heating air. The air-outlet mode switching portion includes a rotary door rotatable around a rotation shaft, and the rotary door includes a circumference wall surface for opening and closing plural air outlet openings through which air is blown toward different zones of a passenger compartment. Further, the heating heat exchanger is arranged to be crossed with a horizontal surface, and a rotation space of the rotary door is provided to extend from an upper side of the heating heat exchanger to a side portion of the heating heat exchanger. Accordingly, the size of the air conditioning unit can be made smaller.

26 Claims, 16 Drawing Sheets

VEHICLE AIR CONDITIONER WITH ROTARY DOOR

CROSS REFERENCE TO RELATED APPLICATION

This application is based on Japanese Patent Applications No. 2001-376998 filed on Dec. 11, 2001, No. 2001-393920 filed on Dec. 26, 2001, and No. 2002-215232 filed on Jul. 24, 2002, the disclosure of which is incorporated herein by reference.

BACKGROUND OF THE INVENTION

1. Field of the Invention

The present invention relates to a vehicle air conditioner with a rotary door having a circumference wall surface, rotated around a rotation shaft, for opening and closing plural air outlet openings.

2. Description of Related Art

In a vehicle air conditioner, plural air outlet openings through which conditioned air is blown into a passenger compartment are opened and closed by a single rotary door formed into a semi-cylindrical shape. In this case, an air outlet mode such as a face mode, a foot mode and a defroster mode is set by rotation of the rotary door. Accordingly, the operation angle of the rotary door becomes larger, and the size of an air conditioning unit of the air conditioner is increased. For example, when the rotary door is disposed above a heater core for heating air, the vertical dimension of the air conditioning unit of the vehicle air conditioner becomes larger.

SUMMARY OF THE INVENTION

In view of the above-described problems, it is an object of the present invention to reduce a size of an air conditioning unit in a vehicle air conditioner in which plural air-outlet opening portions are opened and closed by a single rotary door.

It is another object of the present invention to provide a vehicle air conditioner having an improvement structure of an air-outlet mode switching portion, which prevents interference between the rotary door and a heating heat exchanger, while a size of an air conditioning unit of the vehicle air conditioner can be reduced.

According to the present invention, in an air conditioning unit of a vehicle air conditioner, an air conditioning case for defining an air passage has a plurality of opening portions through which air is blown toward different zones in a passenger compartment, a heat exchanging portion having at least a heating heat exchanger for heating air is disposed in the air conditioning case, and a rotary door is disposed in the air conditioning case at an upper side of the heat exchanging portion to be rotated in a range of a rotation space provided in the air conditioning case. The rotary door has a circumference wall surface rotatable around a rotation shaft to open and close the opening portions, and the rotation space is provided in the air conditioning case to extend from an upper portion of the heating heat exchanger to a side portion of the heating heat exchanger. Accordingly, a dimension between the heating heat exchanger and the rotary door can be set smaller.

Preferably, the heating heat exchanger is arranged in the air conditioning case in a direction crossing with a horizontal surface. Accordingly, the rotation space extending from the upper side of the heating heat exchanger to the side portion of the heating heat exchanger can be made larger, and an outer diameter of the rotary door can be made larger, so that the operation angle of the rotary door for opening and closing the opening portions can be set smaller. Thus, the dimension between the heating heat exchanger and the rotary door can be further reduced. The rotation space of the rotary door can extend to a position proximate to a lower end portion of the heating heat exchanger.

The opening portions include a foot opening through which air is blown toward a lower side in the passenger compartment, a face opening through which air is blown toward an upper side in the passenger compartment, and a defroster opening through which air is blown toward an inner surface of a windshield of the vehicle. In this case, preferably, the rotary door further includes a plate door member disposed at a radial inner side of the circumference wall surface to be integrally rotated with the circumference wall surface, and the rotary door is disposed such that the face opening and the defroster opening are opened and closed by the circumference wall surface, and the foot opening is opened and closed by the plate door member. Therefore, a circumference length of the circumference wall surface can be made smaller, and the size of the air conditioning unit can be further reduced.

Preferably, the air conditioning case has a maximum passage dimension (L) at an upstream side of the rotary door in a direction perpendicular to an axial direction of the rotation shaft, and the rotary door has an outer diameter (D) equal to or larger than 0.8 times of the maximum passage dimension. More preferably, rotary door has an outer diameter (D) larger than the maximum passage dimension. In this case, the space dimension between the heating heat exchanger and the rotary door can be further effectively reduced.

Further, the heating heat exchanger is disposed in the air conditioning case to form a cool air bypass passage through which air bypasses the heating heat exchanger, the air conditioning case includes a guide member which guides at least one of air passing through the cool air bypass passage to an upper side of the heating heat exchanger and air passing through the heating heat exchanger to the upper side of the heating heat exchanger, and the rotation shaft is disposed at a lower side from a top end of the guide member. Accordingly, even when the outer diameter of the rotary door is made larger, the rotary door can be readily rotated without interference.

Preferably, the heating heat exchanger is disposed in the air conditioning case in a range of the outer diameter of the rotary door at a lower side position of the rotation shaft, to be offset from a rotation locus of the rotary door. Accordingly, interference between the rotary door and the heating heat exchanger can be prevented while the size of the air conditioning unit can be reduced.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS (First Embodiment)

Figure 1:
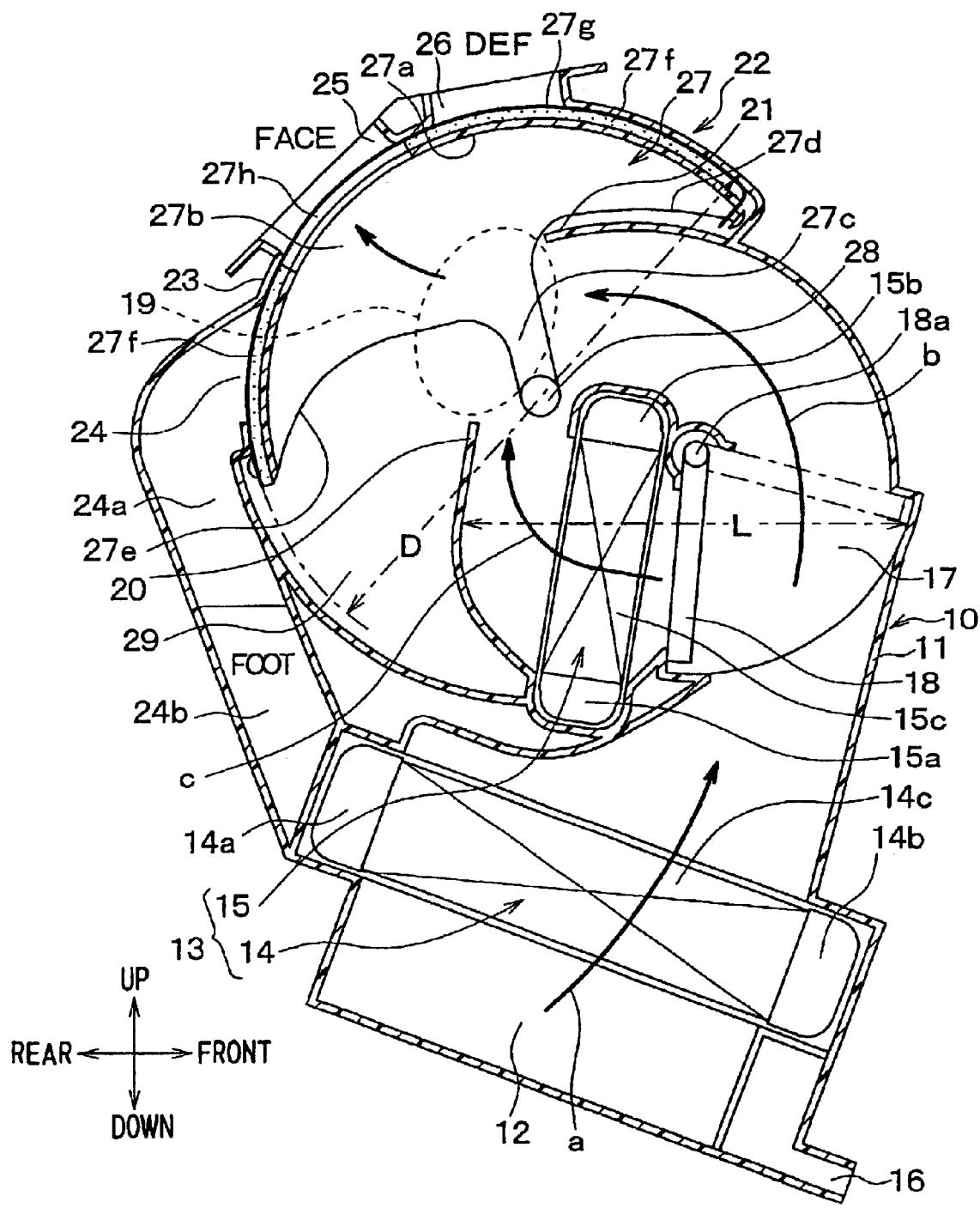
FIG. 1 is a schematic sectional view showing an air conditioning unit of a vehicle air conditioner in a face mode, according to a first embodiment of the present invention.
Figure 2:
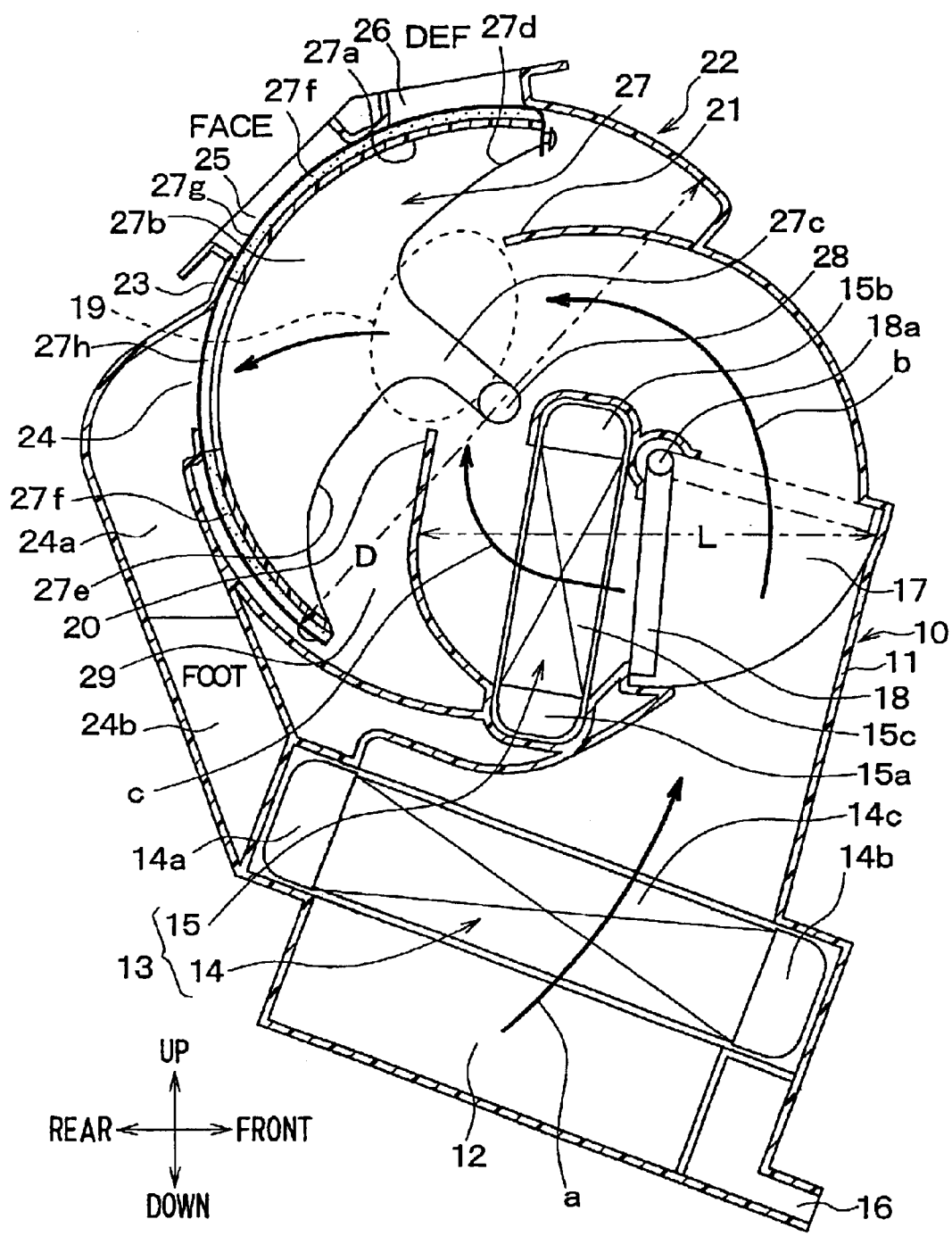
FIG. 2 is a schematic sectional view showing the air conditioning unit in a foot mode, according to the first embodiment.
Figure 3:
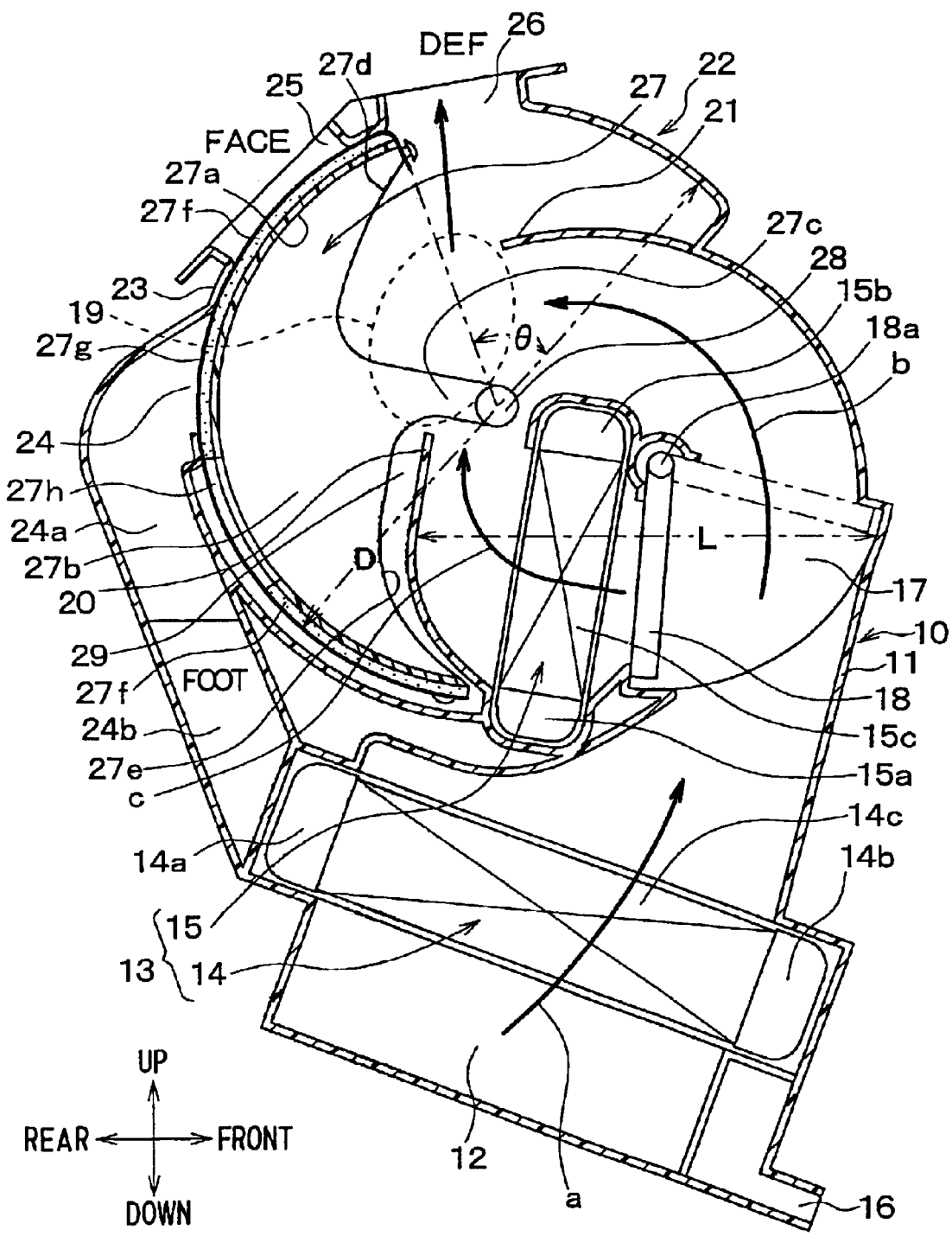
FIG. 3 is a schematic sectional view showing the air conditioning unit in a defroster mode, according to the first embodiment.

The first embodiment of the present invention will be now described with reference to FIGS. 1–3. In the first embodiment, an air conditioning unit 10 of a vehicle air conditioner is mounted on a vehicle to be arranged as shown in FIGS. 1–3 in a vehicle front-rear direction and a vehicle up-down direction (vertical direction). The air conditioning unit 10 is generally disposed at an approximate center inside an instrument panel at a front side in a passenger compartment. FIG. 1 shows the air conditioning unit 10 in a face mode, FIG. 2 shows the air conditioning unit 10 in a foot mode, and FIG. 3 shows the air conditioning unit 10 in a defroster mode.

A blower unit of the vehicle air conditioner is arranged in the instrument panel of the vehicle to be offset from the air conditioning unit 10 toward a front passenger's seat side in the vehicle width direction. The blower unit is disposed to blow air into the air conditioning unit 10. The blower unit includes an inside/outside air switching box for selectively introducing inside air (i.e., air inside the passenger compartment) and outside air (i.e., air outside the passenger compartment), and a blower for blowing air introduced from the inside/outside air switching box into the air conditioning unit 10. The blower includes a centrifugal fan, for example.

The air conditioning unit 10 has an air conditioning case 11 made of a resin. The air conditioning case 11 is formed into a vertically elongated shape, and defines therein an air passage through which air flows from below toward an upper side. An air inlet space 12 is provided in the air conditioning case 11 at a bottom side so that air blown by the blower unit flows into the air inlet shape 12.

A heat exchange portion 13 is disposed in the air conditioning case 11 at an upper side of the air inlet space 12. The heat exchange portion 13 includes an evaporator 14 used as a cooling heat exchanger, and a heater core 15 used as a heating heat exchanger. The evaporator 14 is disposed at an immediate upper side of the air inlet space 12, and the heater core 15 is disposed at an upper side of the evaporator 14.

As shown in FIGS. 1–3, the evaporator 14 is disposed approximately horizontally at an upper side position separated from a bottom surface of the air conditioning case 11 by a predetermined height dimension. In the first embodiment, the evaporator 14 is slightly tilted from a horizontal surface toward a lower side at the vehicle front side by a predetermined tilt angle (e.g., 20°). Because the evaporator 14 is disposed to be slightly tilted from the horizontal surface, a dimension of the air conditioning case 11 in the vehicle front-rear direction can be reduced. Further, because the evaporator 14 is titled, condensed water generated on the evaporator 14 is readily collected at a tilt lower end portion on the vehicle front side of the evaporator 14, so that condensed water can be smoothly discharged from the tilt lower end portion of the evaporator 14. A discharge port 16 is opened in the air conditioning case 11 on the bottom surface at a most front side portion.

Low pressure refrigerant decompressed in a decompression unit in a refrigerant cycle flows into the evaporator 14, and is evaporated in the evaporator 14 by absorbing heat from air passing through the evaporator 14, so that air passing through the evaporator 14 is cooled. The evaporator 14 includes first and second tank portions 14a, 14b, and a heat exchange core portion 14c disposed between the first and second tank portions 14a, 14b. In the heat exchange core portion 14a of the evaporator 14, plural flat tubes and plural corrugated fins are laminated alternately to be arranged in parallel with each other. Air introduced into the air inlet space 12 passes through the heat exchange core portion 14c of the evaporator 14 from below upwardly, as shown by the arrow "a" in FIGS. 1–3.

The heater core 15 is disposed in the air conditioning case 11 at an approximate center position in the vehicle front-rear direction, at an upper side of the evaporator 14. The heater core 15 is a heating heat exchanger for heating air using hot water (engine-cooling water) from a vehicle engine as a heating source. The heater core 15 includes an inlet tank portion 15a, an outlet tank portion 15b, and a heat exchange core portion 15c disposed between the inlet tank portion 15a and the outlet tank portion 15b. In the first embodiment, for example, the inlet tank portion 15a is disposed at a lower side of the heat exchange core portion 15c, and the outlet tank portion 15b is disposed at an upper side of the heat exchange core portion 15c. In the heat exchange core portion 15c of the heater core 15, plural flat tubes and plural corrugated fins are laminated alternately to be arranged in parallel with each other.

The heater core 15 is a one-way flow type in which hot water flowing into the inlet tank portion 15a flows through all the plural tubes of the heat exchange core portion 15c in one way toward the outlet tank portion 15b.

The heater core 15 is disposed in the air conditioning case 11 approximately vertically, so that a surface of the heat exchange core portion 15c of the heater core 15 extends approximately in the vertical direction. Because the heater core 15 is disposed on the upper side of the evaporator 14 at the approximate center position in the vehicle front-rear direction, a cool air bypass passage 17 through which cool air flows as shown by the arrow "b" while bypassing the heater core 15 is provided at a vehicle front side of the heater core 15. An air mixing door 18 is disposed to adjust a flow ratio between an air amount passing through the heater core 15 and an air amount passing through the cool air bypass passage 17. The air mixing door 18 is rotated around a rotation shaft 18a, and the rotation shaft 18a is provided at a front side position proximate to a top end portion of the heater core 15. The rotation shaft 18a is disposed to extend in the vehicle width direction, and both end portions of the rotation shaft 18a is rotatably held in shaft bearings provided in a wall surface of the air conditioning case 11. In the first embodiment, the rotation shaft 18a is connected to a top end portion of the air mixing door 18 formed into a plate like. The air mixing door 18 is rotated around the rotation shaft 18a between the solid line position (maximum cooling position) and the chain line position (maximum heating position) in FIGS. 1–3.

When the air mixing door 18 is rotated at the solid line position, a passage of the core portion 15c is fully closed so that a maximum cooling is set on the other hand, when the air mixing door 18 is rotated to the chain line position, the cool air bypass passage 17 is fully closed so that a maximum heating is set. When the air mixing door 18 opens the passage of the core portion 15c of the heater core 15 by a predetermined opening degree, air having passed through the evaporator 14 passes through the core portion 15c of the heater core 15 as shown by the arrow "c", and flows toward the upper side of the heater core 15. Accordingly, the air mixing door 18 adjusts temperature of air blown into the passenger compartment by adjusting the flow ratio between the air amount passing through the heater core 15 and the air amount passing through the cool air bypass passage 17.

An air mixing portion 19 is provided at an upper side of the heater core 15. Air from the heater core 15 and air from the cool air bypass passage 17 are mixed in the air mixing portion 19 so that conditioned air having a predetermined temperature can be obtained. A warm air guide wall 20 is provided to extend from a lower side position of the heater core 15 on the vehicle rear side toward upwardly within the air conditioning case 11. Therefore, warm air from the heater core 15 is guided by the warm air guide wall 20 toward the air mixing portion 19 as shown by the arrow "c".

The cool air bypass passage 17 is provided in the air conditioning case 11 to be bent from the vehicle front side of the heater core 15 toward the vehicle rear side after passing through the front side space of the heater core 15 upwardly. Therefore, the cool air bypass passage 17 is gradually bent while extending from the vehicle front side of the heater core 15 to the upper rear side of the heater core 15. A cool air guide wall 21 is provided to extend from a front wall surface of the air conditioning case 11 toward a vehicle rear side. Specifically, the cool air guide wall 21 extends upwardly from the front wall surface of the air conditioning case 11, and protrudes approximately horizontally toward the vehicle rear side. Accordingly, cool air from the cool air bypass passage 17 is guided by the cool air guide wall 21 toward the air mixing portion 19 as shown by the arrow "b".

An air-outlet mode switching portion 22 is disposed in an upper surface of the air conditioning case 11 on an upper side of the air mixing portion 19 at a downstream position of the air mixing portion 19. The air-outlet mode switching portion 22 has a semi-cylindrical seal surface 23. A circumference surface of the seal surface 23 extends in the vehicle front-rear direction. A foot opening 24 is opened in the seal surface 23 at a lower position on a most vehicle rear side, a face opening 25 is provided in the seal surface 23 at a front upper side from the foot opening 24, and a defroster opening 26 is provided at a front side position from the face opening 25.

The foot opening 24 communicates with foot air outlets 24b through a foot air passage 24a defined by a vehicle rear side surface of the air conditioning case 11. The foot air outlets 24b are opened in the air conditioning case 11 at right and left two sides in the vehicle width direction, so that conditioned air is blown toward right and left side in the foot area of the passenger compartment. The face opening 25 is provided so that conditioned air is blown toward the upper side in the passenger compartment from the face opening 25 through a face duct. The defroster opening 26 is provided so that conditioned air is blown toward an inner surface of a windshield from the defroster opening 26 through a defroster duct.

A rotary door 27 is disposed inside the seal surface 23 of the air conditioning case 11 to be rotatable by a rotation shaft 28 in the vehicle front-rear direction. The rotary door 27 includes a circumference wall surface 27a having a predetermined radius of curvature around the rotation shaft 28, and two side plate portions 27b provided at two end sides of the circumference wall surface 27a in an axial direction (e.g., vehicle width direction). The circumference wall surface 27a of the rotary door 27 is connected to the rotation shaft 28 through the two side plates 27b. The circumference wall surface 27a, the two side plate portions 27b and the rotation shaft 28 can be integrally formed from a resin.

The rotation shaft 28 is rotatably held in bearing holes provided in right and left side walls of the air conditioning case 11. The rotation shaft 28 is provided adjacent to the top end portion of the heater core 15 at a rear side position of the heater core 15. Therefore, the rotation shaft 28 is separated from the cool air guide wall 21 to a lower side by a distance larger than a predetermined distance. The rotation shaft 28 is set at a height position around the top end of the warm air guide wall 20. Accordingly, a radial inside portion 27c in each of the two side plate portions 27b, adjacent to the rotation shaft 28, is positioned between the top end portions of the two guide walls 20, 21.

In the first embodiment, in order to prevent the radial inside portion 27c from interfering with the top end portions of the guide walls 20, 21, the dimension of the radial inside portion 27c in the vehicle front-rear direction is made small to be approximately equal to an outer diameter of the rotation shaft 28. A radial outside portion of each side plate portion 27b, adjacent to the circumference wall surface 27a, is enlarged in a fan shape. The radial outside portion of the side plate portion 27b has a first bent portion 27d bent along the cool air guide wall 21, at one side in the rotation direction of the rotary door 27 as shown in FIG. 1. Further, as shown in FIG. 3, the radial outside portion of the side plate portion 27b has a second bent portion 27e bent along the warm air guide wall 20, at the other side in the rotation direction of the rotary door 27. Accordingly, it can prevent interference between the side plate portions 27b and the two guide walls 20, 21 when the rotary door 27 is rotated in the vehicle front-rear direction.

A film member 27g made of a resinous film material is attached to an outer peripheral side of the circumference wall surface 27a through an elastic material 27f to be integrally rotated with the circumference wall surface 27a. An air pressure inside the rotary door 27 is applied to the film member 27g through an opening portion (not shown) provided in the circumference wall surface 27a and an opening portion (not shown) provided in the elastic material 27f, communicating with the opening portion of the circumference wall surface 27a. Accordingly, the film member 27g can press-contact the seal surface 23 of the air conditioning case 11 by the air pressure and an elastic pressure force of the elastic material 27f to accurately close the air openings 24–26.

A communication hole 27h penetrating through the circumference wall surface 27a, the elastic material 27f and the film member 27g of the rotary door 27 is provided at a position of the circumference wall surface 27a, the elastic material 27f and the film member 27g. The communication hole 27h is provided in the rotary door 27 to open the opening portions 24–26.

A semi-cylindrical door rotation space 29, in which the rotary door 27 is rotatable, is formed inside the semi-cylindrical seal surface 23 of the air conditioning case 11 at the upper side portion. The door rotation space 29 is formed in the air conditioning case 11 in a range from an upper side position of the cool air guide wall 21 to a side portion of the heater core 15. The side portion of the heater core 15 is provided at a vehicle rear side position of the warm air guide wall 20 that is positioned on the vehicle rear side of the heater core 15. The door rotation space 29 extends to a position around the lower end portion of the heater core 15 on the vehicle rear side.

In the first embodiment, the rotation shaft 28 of the rotary door 27 is disposed adjacent to the upper end portion of the heater core 15, and an outer diameter D of the rotary door 27 is set larger than a maximum passage dimension L at an upstream side of the rotary door 27. Here, the maximum passage dimension L is a maximum passage dimension in a direction (i.e., horizontal direction) perpendicular to the axial direction of the rotation shaft 28, at the upstream side of the rotary door 27. In the first embodiment, the maximum passage dimension L is the dimension in the vehicle front-rear direction.

The outer diameter D of the rotary door 27 is the double of the radius of curvature between the rotation center of the rotary door 27 and an outer peripheral surface of the film member 27g when the rotary door 27 is attached to inside the seal surface 23 of the air conditioning case 11. For example, the outer diameter D of the rotary door 27 is about 200 mm, and the maximum passage dimension L is about 155 mm. Therefore, in this case, the outer diameter D is about 1.29 times of the maximum passage dimension L (D≈L×1.29).

In order to increase the outer diameter D of the rotary door 27, the door rotation space 29 is provided to extend to the position around the lower end portion of the heater core 15 on the vehicle rear side. An operation angle θ of the rotary door 27 is an angle between the operation position in the face mode shown in FIG. 1 and the operation position in the defroster mode shown in FIG. 3. In the first embodiment, because the outer diameter D is made larger, the operation angle θ can be reduced to about 65°.

The rotation shaft 28 of the rotary door 27 protrudes to an outside of the air conditioning case 11, and is connected to a mode operation mechanism through a link mechanism, so that the rotary door 27 is rotated by the mode operation mechanism. Similarly, the rotation shaft 18a of the air mixing door 18 protrudes to an outside of the air conditioning case 11, and is connected to a temperature adjustment operation mechanism through a link mechanism, so that the air mixing door 18 is rotated by the temperature adjustment operation mechanism. Each of the mode operation mechanism and the temperature adjustment operation mechanism can be constructed by an automatic mechanism using a servomotor, or can be constructed by a manual operation mechanism that is directly operated manually by a passenger in the passenger compartment.

Next, operation of the first embodiment of the present invention will be now described. When the blower of the blower unit operates, inside air or outside air is introduced from the inside/outside air switching box, and flows into the air inlet space 12 of the air conditioning case 11 at the bottom side. Thereafter, air passes through the evaporator 14 from below upwardly as shown by arrow "a" so that cool air is obtained. Air from the evaporator 14 is divided into air passing through the cool air bypass passage 17 and air passing through the heater core 15 in accordance with the opening degree of the air mixing door 18. Warm air "c" passing through the heater core 15 is guided by the warm air guide wall 20, and is introduced into the air mixing portion 19, and cool air "b" passing through the cool air bypass passage 17 is guided by the cool air guide wall 21, and is introduced into the air mixing portion 19. Warm air "c" and cool air "c" are mixed in the air mixing portion 19 so that conditioned air having a predetermined temperature is obtained.

An air outlet mode such as the face mode, the foot mode and the defroster mode can be set by the rotation operation of the rotary door 27. The rotary door 27 is operated to open and close the foot opening 24, the face opening 25 and the defroster opening 26, so that conditioned air is blown into the passenger compartment through at least one of the openings 24–26.

In the face mode shown in FIG. 1, the face opening 25 is opened by the communication hole 27h of the rotary door 27, and the foot opening 24 and the defroster opening 26 are closed by the film member 27g of the circumference wall surface 27a of the rotary door 27.

In the foot mode shown in FIG. 2, the foot opening 24 is opened by the communication hole 27h, and the face opening 25 and the defroster opening 26 are closed by the film member 27g of the circumference wall surface of the rotary door 27.

In the defroster mode shown in FIG. 3, the rotary door rotates counterclockwise in maximum. In this case, the circumference wall surface 27a of the rotary door 27 is rotated to a position without facing the defroster opening 26, so that the defroster opening 26 is opened. Further, the foot opening 24 and the face opening 25 are closed by the film member 27g of the circumference wall surface 27a of the rotary door 27.

When the rotary door 27 is rotated to a position between FIG. 1 and FIG. 2, both the foot opening 24 and the face opening 25 are opened by the communication hole 27h, so that a bi-level mode can be set. Further, when the rotary door 27 is rotated to a position between FIG. 2 and FIG. 3, the foot opening 24 is opened by the communication hole 27h, and the defroster opening 26 is also opened, so that a foot/defroster mode can be set. In the foot/defroster mode, an opening ratio of the foot opening 24 is approximately equal to that of the defroster opening 26. Further, in the foot mode shown in FIG. 2, the defroster opening 26 can be slightly opened. In this case, a small amount of warm air is also blown toward the inner surface of the windshield from the defroster opening 26 while a large amount of warm air is blown toward the foot area in the passenger compartment in the foot mode, so defrosting performance of the windshield can be improved in the foot mode.

Figure 16:
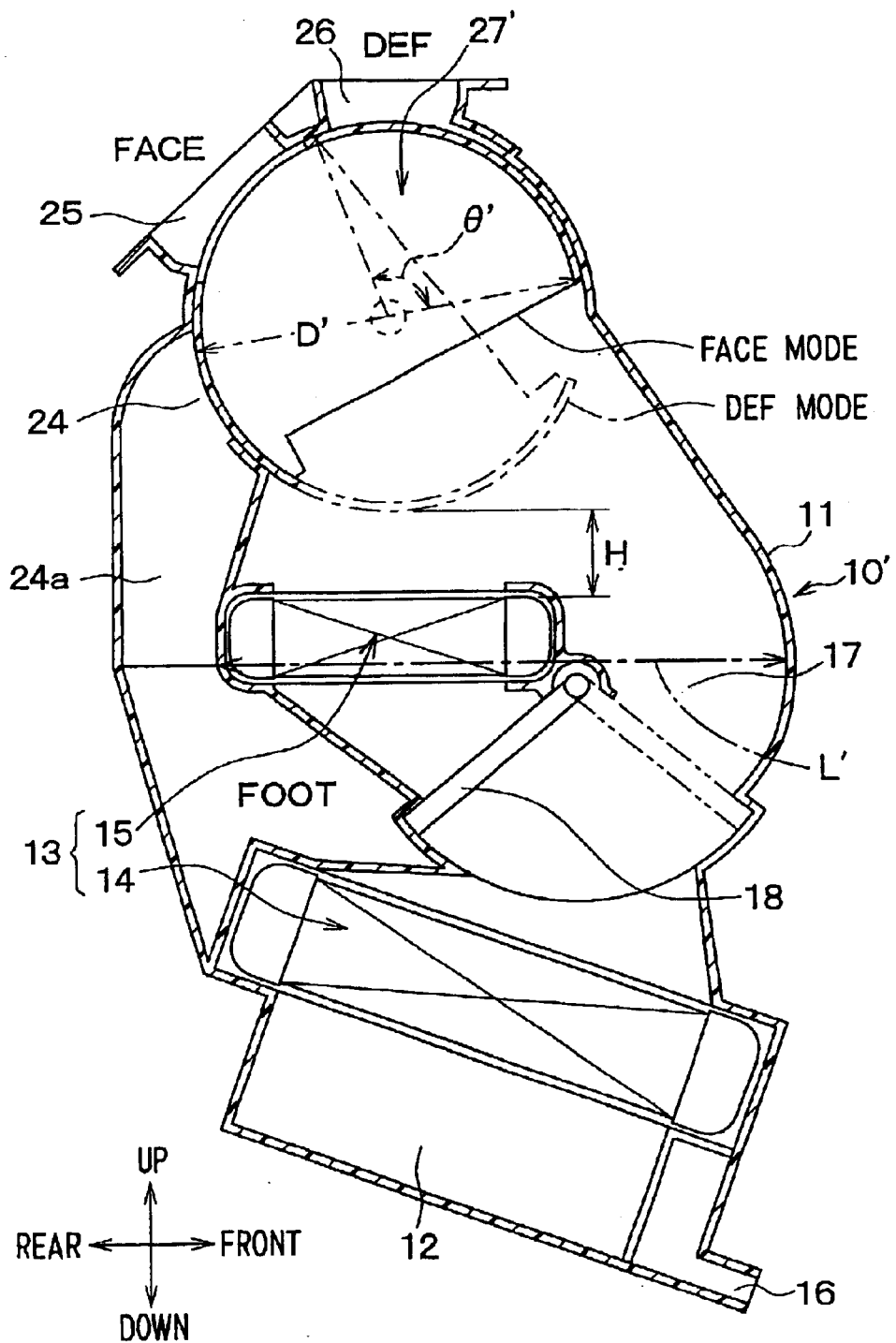
FIG. 16 is a schematic sectional view showing an air conditioning unit in a comparison example.

For example, as shown in FIG. 16, when a rotary door 27' is disposed above the heater core 15 to open and close the foot opening 24, the face opening 25 and the defroster opening 26 as shown in FIG. 16 in an air conditioning unit 10' of a comparison example, the height dimension of the air conditioning unit 10' becomes larger. In the comparison example, the outer diameter D' of the rotary door 27' is made smaller to be set in a range of 120–150 mm, so that the outer diameter D' is smaller 0.8 times of the maximum passage dimension L' (D'<L'×0.8) in the horizontal direction at the upstream side of the rotary door 27'. In this case, the operation angle θ' of the rotary door 27' is set to about 100° for opening and closing the openings 24–26 by the rotation of the rotary door 27'. Further, a height dimension H of about 30 mm is necessary between the rotary door 27' and the heater core 15 in order to sufficiently mix warm air from the heater core 15 and cool air from the cool air bypass passage 17, in this arrangement of the comparison example. Accordingly, in the comparison example shown in FIG. 16, the height dimension of the air conditioning unit 10' is increased, and the size of the air conditioning unit 10' becomes larger.

According to the first embodiment of the present invention, the outer diameter of the rotary door 27 is set to be larger that the maximum passage dimension L in the horizontal direction at the upstream side of the rotary door 27. For example, the outer diameter D of the rotary door 27 is about 1.29 times of the maximum passage dimension L. Therefore, the operation angle θ of the rotary door 27 for opening and closing the three openings 24–26 can be reduced to about 65°, and the height dimension of the air conditioning unit 10 can be greatly reduced as compared with the comparison example in FIG. 16.

According to the first embodiment of the present invention, the rotation shaft 28 is disposed around the top end portion of the heater core 15, and the door rotation space 29 of the rotary door 27 is provided from the upper side of the heater core to a rear side of the heater core 15, so that an end of the circumference surface 27a of the rotary door 27 in the circumference direction is rotated to the position proximate to the lower end portion of the heater core 15. Accordingly, a height dimension between the upper end portion of the heater core 15 and the upper surface of the air conditioning case 11 can be reduced to be approximately equal to the radius (e.g., 100 mm) of the rotary door 27, so that the size of the air conditioning unit 10 can be further reduced.

Further, according to the first embodiment of the present invention, the heater core 15 is disposed approximately vertically, and the door rotation space 29 of the rotary door 27 is provided to extend from the upper side of the heater core 15 to the position around the lower end portion of the heater core 15 at the vehicle rear side of the heater core 15. Therefore, the face opening 25 can be positioned on the upper rear surface of the air conditioning case 11 at an upper side of the foot opening 24. Therefore, when the air conditioning unit 10 is mounted in the instrument panel, cool air can be readily blown from the face opening 25 provided on the vehicle rear side in the air conditioning case 11.

(Second Embodiment)

Figure 4:
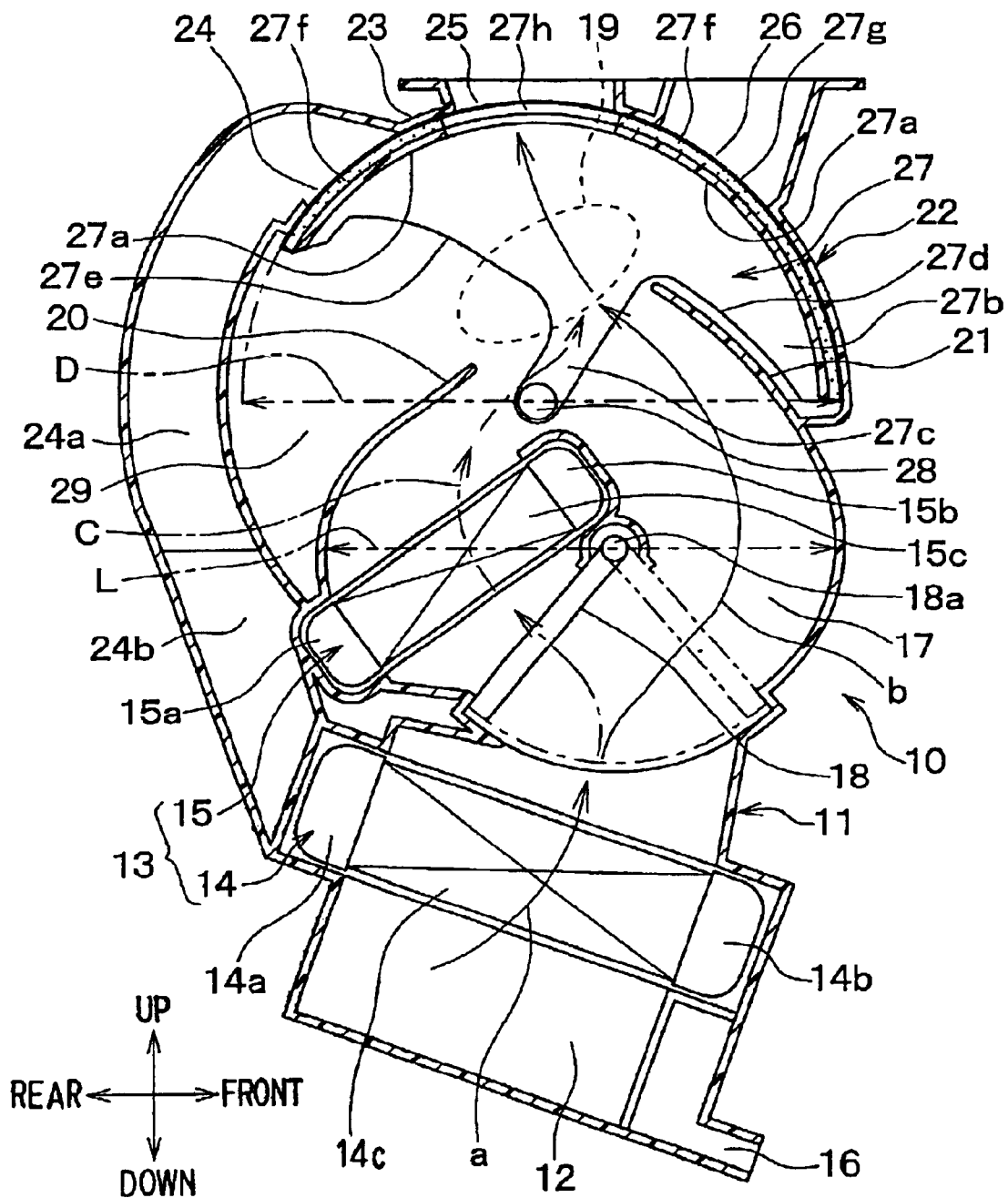
FIG. 4 is a schematic sectional view showing an air conditioning unit of a vehicle air conditioner in a face mode, according to a second embodiment of the present invention.
Figure 5:
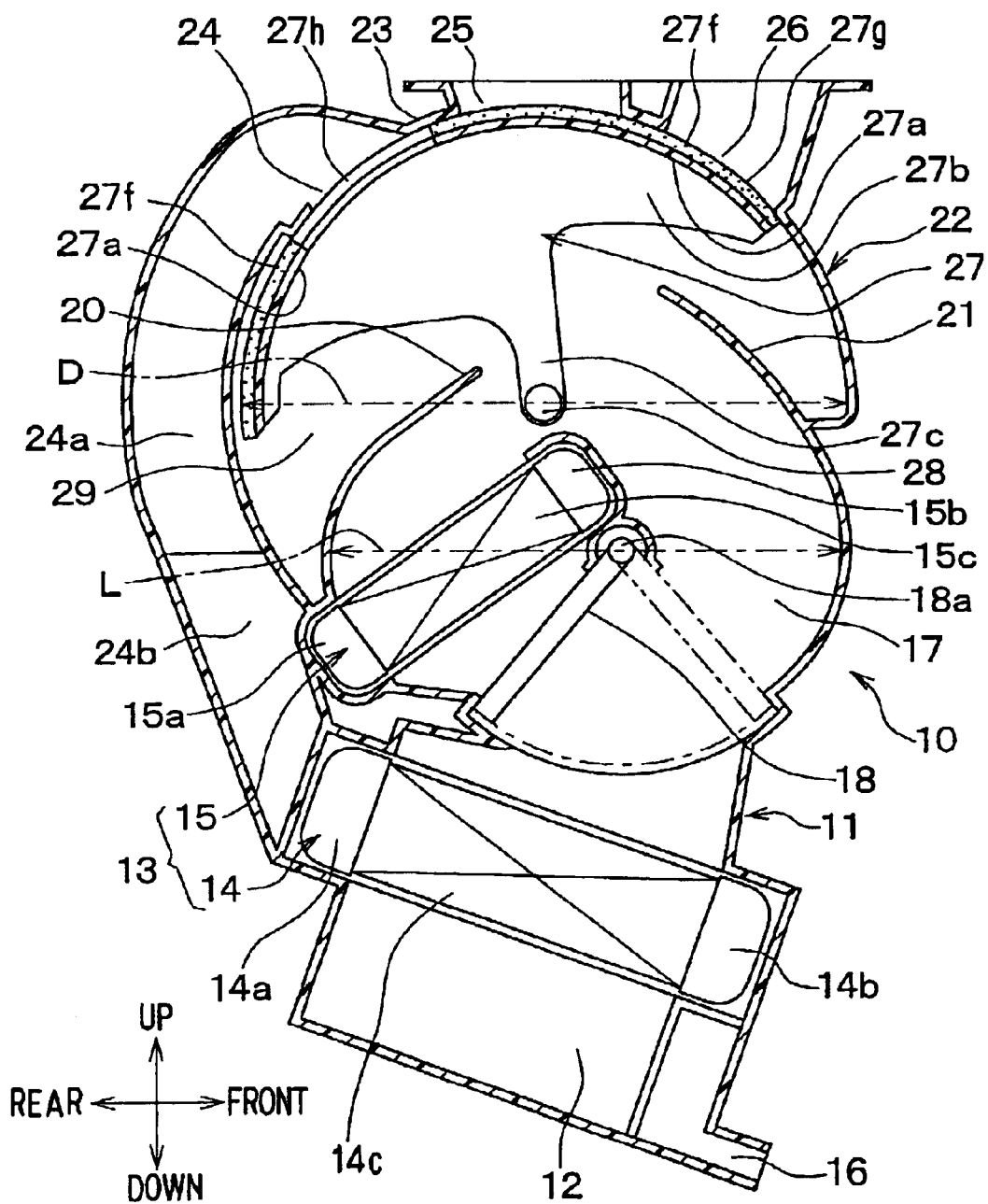
FIG. 5 is a schematic sectional view showing the air conditioning unit in a foot mode, according to the second embodiment.
Figure 6:
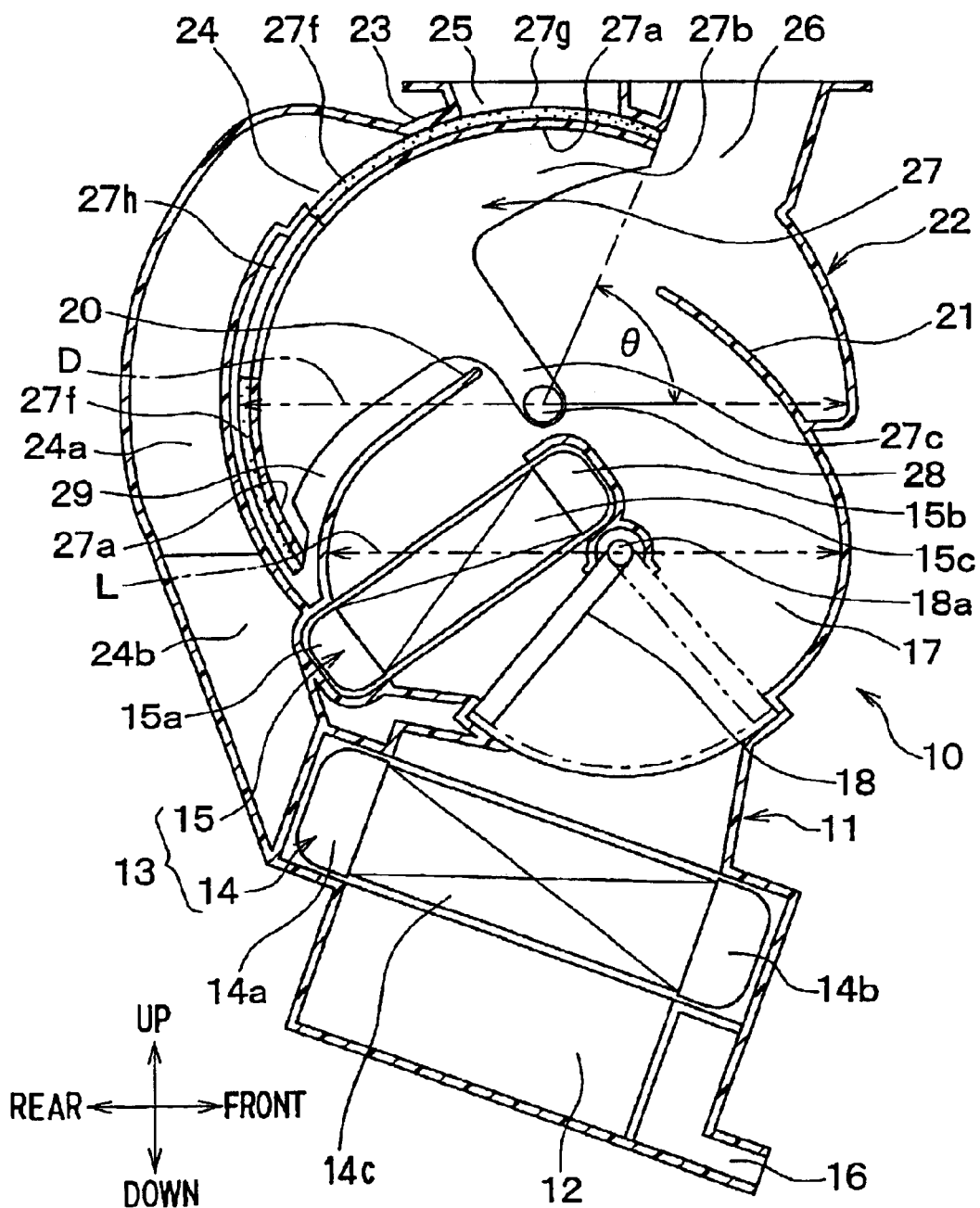
FIG. 6 is a schematic sectional view showing the air conditioning unit in a defroster mode, according to the second embodiment.

The second embodiment of the present invention will be now described with reference to FIGS. 4–6. In the above-described first embodiment of the present invention, the heater core 15 is disposed approximately vertically. However, in the second embodiment, as shown in FIGS. 4–6, the upper end portion of the heater core 15 is tilted toward the vehicle front side from the vertical direction by a predetermined angle. The heater core 15 is tilted between the vertical direction and the horizontal direction.

The evaporator 14 is tilted so that the vehicle rear side end of the evaporator 14 is positioned at the upper side. On the other hand, the heater core 15 is tilted to a direction opposite to the tilt direction of the evaporator 14 so that the vehicle rear side end of the heater core 15 is positioned lower and the vehicle front side of the heater core 15 is positioned higher.

Further, the warm air guide wall 20 and the cool air guide wall 21 are also shifted to be rotated clockwise by the predetermined angle from the position of the first embodiment, in accordance with the position shaft of the heater core 15. Therefore, in the second embodiment, the rotation shaft 28 of the rotary door 27 is set at a position lower than the top end of the warm air guide wall 20 and the top end of the cool air guide wall 21. Accordingly, the door rotation space 29 of the rotary door 27 is also shifted to be rotated clockwise from the position in the first embodiment. Thus, the face opening 25 is positioned at an approximate intermediate position on the upper surface in the air conditioning case 11 in the vehicle front-rear direction.

In the second embodiment, for example, the outer diameter D of the rotary door 27 is 200 mm, and the maximum passage dimension L is about 180 mm. In this case, the outer diameter D of the rotary door 27 is about 1.12 times of the maximum passage dimension L. Accordingly, the outer diameter D of the rotary door 27 can be set larger than the maximum passage diameter L. Because the outer diameter D of the rotary door 27 is made larger, the rear-side lower end of the door rotation space 29 extends to the lower end portion of the warm air guide wall 20, and the front-side lower end of the door rotation space 29 extends to a middle position of the cool air guide wall 20 in the vertical direction.

FIG. 4 shows the face mode in the air conditioning unit 10 of the second embodiment. Similarly to the above-described first embodiment, in the face mode shown in FIG. 4, the face opening 25 is opened by the communication hole 27h of the rotary door 27, and the foot opening 24 and the defroster opening 26 are closed by the film member 27g of the circumference wall surface 27a of the rotary door 27.

FIG. 5 shows the foot mode in the air conditioning unit 10 in the second mode, In the foot mode shown in FIG. 5, the foot opening 24 is opened by the communication hole 27h, and the face opening 25 and the defroster opening 26 are closed by the film member 27g of the circumference wall surface 27a of the rotary door 27.

FIG. 6 shows the defroster mode in the air conditioning unit 10 of the second embodiment. In the defroster mode shown in FIG. 6, the rotary door 27 rotates counterclockwise in maximum. In this case, the circumference wall surface 27a of the rotary door 27 is rotated to a position without facing the defroster opening 26, so that the defroster opening 26 is opened. Further, the foot opening 24 and the face opening 25 are closed by the film member 27g of the circumference wall surface 27a of the rotary door 27.

When the rotary door 27 is rotated to a position between FIG. 4 and FIG. 5, both the foot opening 24 and the face opening 25 are opened by the communication hole 27h, so that a bi-level mode can be set. Further, when the rotary door 27 is rotated to a position between FIG. 5 and FIG. 6, the foot opening 24 is opened by the communication hole 27h, and the defroster opening 26 is also opened, so that a foot/defroster mode can be set. In the foot/defroster mode, an opening ratio of the foot opening 24 is approximately equal to that of the defroster opening 26. Further, in the foot mode shown in FIG. 5, the defroster opening 26 can be slightly opened. In this case, a small amount of warm air is blown toward the inner surface of the windshield from the defroster opening 26 while a large amount of warm air is blown toward the foot area in the passenger compartment in the foot mode, so defrosting performance of the windshield can be improved.

According to the second embodiment of the present invention, the outer diameter of the rotary door 27 is set to be larger that the maximum passage dimension L in the direction (i.e., horizontal direction) perpendicular to the axial direction of the rotation shaft 28 at the upstream side of the rotary door 27. For example, the outer diameter D of the rotary door 27 is about 1.12 times of the maximum passage dimension L. Therefore, the operation angle θ of the rotary door 27 for opening and closing the three openings 24–26 can be reduced to about 65°.

According to the second embodiment of the present invention, the rotation shaft 28 is disposed around the top end portion of the heater core 15, and the door rotation space 29 of the rotary door 27 is provided from the upper side of the heater core 15 to the rear side of the heater core 15, so that an end of the circumference surface 27a of the rotary door 27 in the circumference direction is rotated to the position proximate to the lower end portion of the heater core 15. Accordingly, the height dimension between the upper end portion of the heater core 15 and the upper surface of the air conditioning case 11 can be reduced to be approximately equal to the radius (e.g., 100 mm) of the rotary door 27, so that the size of the air conditioning unit 10 can be reduced.

In the second embodiment, the other parts of the air conditioning unit 10 are similar to those of the above-described first embodiment, and detail explanation thereof is omitted.

(Third Embodiment)

The third embodiment of the present invention will be described with reference to FIGS. 7–9.

In the above-described first and second embodiments of the present invention, all of the foot opening 24, the face opening 25 and the defroster opening 26 are opened and closed by the rotation movement of the circumference wall surface 27a of the rotary door 27. However, in the third embodiment, as shown in FIGS. 7–9, first and second plate door portions 27i, 27j rotated integrally with the circumference wall surface 27a are provided, and the foot opening 24, the face opening 25 and the defroster opening 26 are opened and closed by the combination of the circumference wall surface 27a and the first and second plate door portions 27i, 27j.

A partition wall 30 is connected to the top end portion of the warm air guide wall 20, and extends to a vehicle rear side portion of the air conditioning case 11, so that the foot air passage 24a is partitioned at the vehicle rear side of the warm air guide wall 20. The partition wall 30 protrudes upwardly in a mountain shape. Because the partition wall 30 protrudes upwardly in the mountain shape, the door rotation space 29 extends to a vehicle rear side position of the partition wall 30 around the bottom area of the partition wall 30. Therefore, the foot air passage 24a is positioned inside the door rotation space 29.

The foot opening 24 is opened in the partition wall 30, and the first plate portion 27i is disposed at a lower side of the foot opening 24. The first plate door portion 27i and the second plate door portion 27j are connected through two connection arm portions 27k positioned at two end sides in the axial direction of the rotation shaft 28 of the rotary door 27. The first plate door portion 27i and the connection arm portions 27k can be molded integrally with the rotary door 27, or can be formed separately from the rotary door 27. The first plate door portion 27i extends in the axial direction of the rotation shaft 28 of the rotary door 27, and is formed into a plate shape having an area larger than the opening area of the foot opening 24 to close the foot opening 24. In the third embodiment, the first plate door portion 27i is connected to the two connection arm portion 27k at two end sides of the first plate door 27i in the axial direction of the rotation shaft 28 of the rotary door 27. The two connection arm portions 27k penetrate through the foot opening 24, and extend in a circular arc shape.

On the other hand, the second plate door portion 27j is formed integrally with the rotary door 27 between the right and left side plates 27b positioned at the two ends of the rotary door 27 in the axial direction of the rotation shaft 28. The second plate door portion 27j is formed to have a plate shape similar to the first plate door portion 27i. The two plate door portions 27i, 27j are disposed on radial inner side of the circumference wall surface 27a at the same radial position from the rotation shaft 28. When the first plate door portion 27i and the two connection arm portions 27k are formed separately from the rotary door 27, top end portions of the two connection arm portion 27k are fitted to the second plate door portion 27j to be fixed to the second plate door portion 27j by fastening means such as bonding and screwing.

An elastic seal member 27m is provided on an upper surface of the first plate door portion 27i to be bonded to the upper surface of the first plate door portion 27i, and an elastic seal member 27n is provided on a lower surface of the second plate door portion 27j to be bonded to the lower surface of the second plate door portion 27j. However, the elastic members 27m, 27n can be molded integrally with the first and second plate door portions 27i, 27j, respectively, by using a rubber material.

In the third embodiment, a circumference length of the circumference wall surface 27a of the rotary door 27 can be made shorter as compared with the above-described first and second embodiments, and the communication hole 27h of the circumference wall surface 27a described in the first and second embodiments is omitted.

Figure 7:
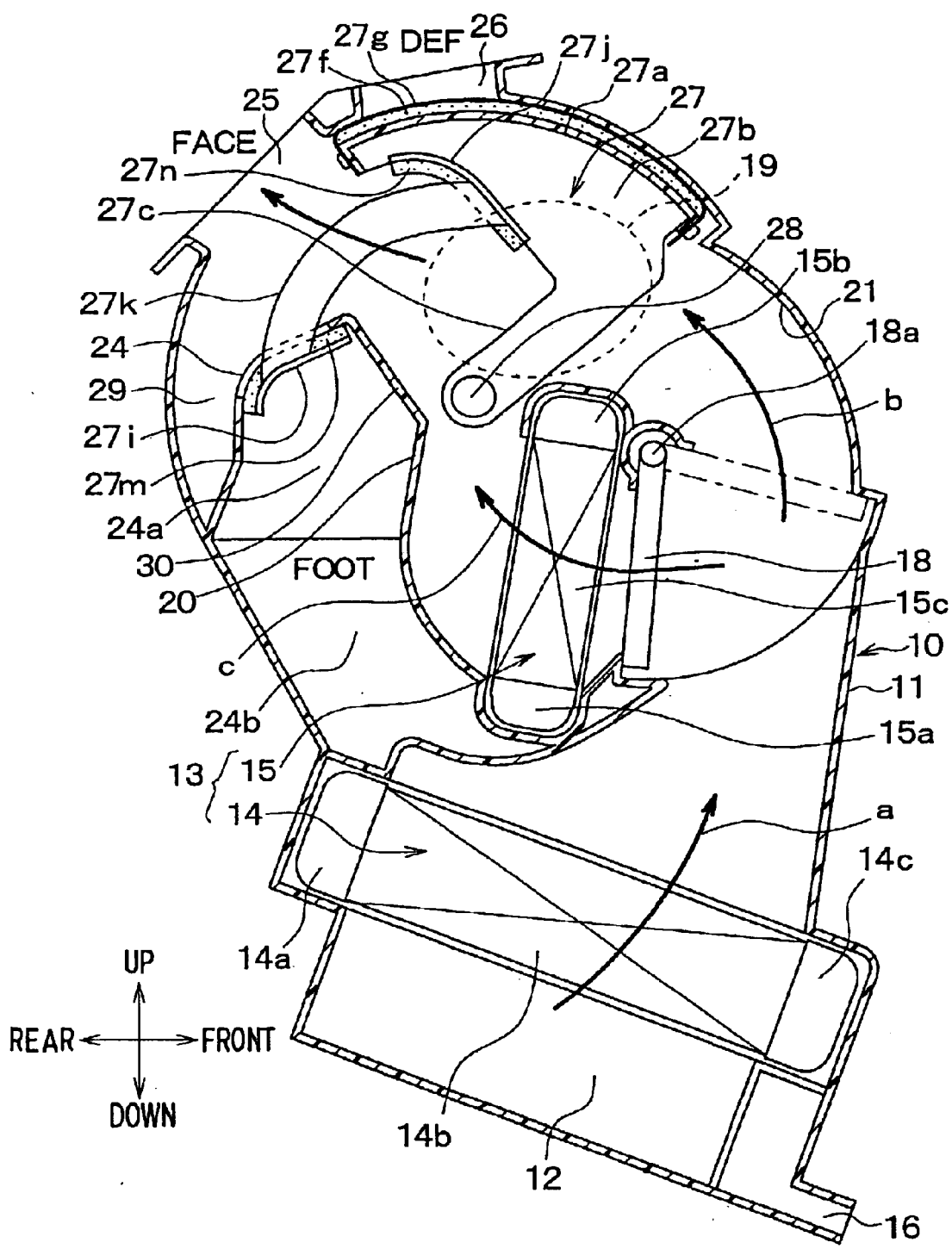
FIG. 7 is a schematic sectional view showing an air conditioning unit of a vehicle air conditioner in a face mode, according to a third embodiment of the present invention.

FIG. 7 shows the face mode in the third embodiment. In the face mode, the defroster opening 26 is closed by the film member 27g of the circumference wall surface 27a, and the foot opening 24 is closed by the elastic seal member 27m of the first plate door portion 27i. Further, the circumference wall surface of the rotary door 27 is rotated to a position without facing the face opening 25, so that the face opening 25 is opened.

Figure 8:
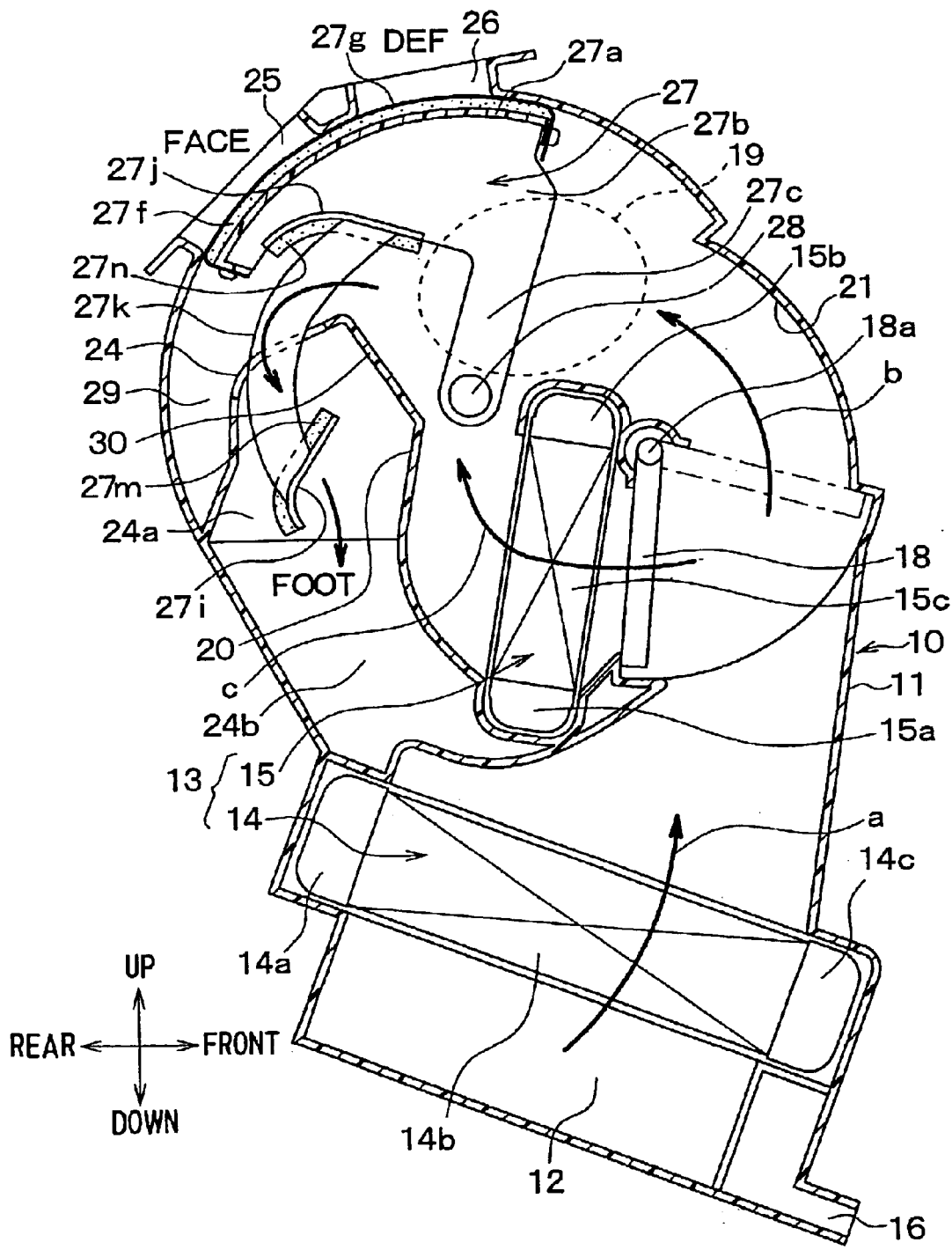
FIG. 8 is a schematic sectional view showing the air conditioning unit in a foot mode, according to the third embodiment.

FIG. 8 shows a foot mode in the third embodiment. When the foot mode is set, the rotary door 27 is rotated counterclockwise from the position of FIG. 7 by a predetermined angle. Therefore, in the foot mode, the face opening 25 and the defroster opening 26 are closed by the film member 27g of the circumference wall surface 27a, and the first plate door portion 27i is moved to be separated from the foot opening 24 to open the foot opening 24.

Figure 9:
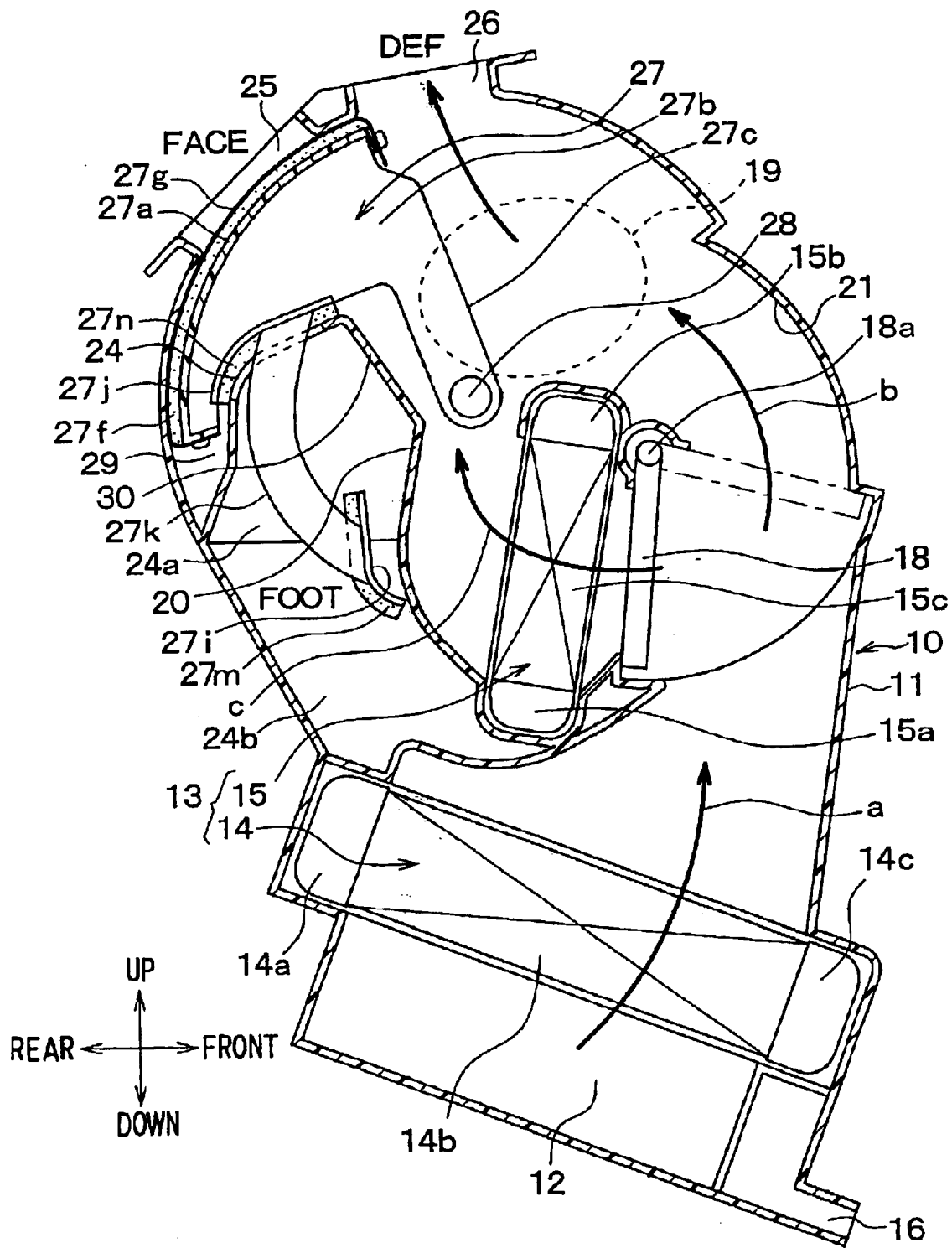
FIG. 9 is a schematic sectional view showing the air conditioning unit in a defroster mode, according to the third embodiment.

FIG. 9 shows the defroster mode in the third embodiment. When the defroster mode is set, the rotary door 27 is further rotated counterclockwise from the position in FIG. 8 by a predetermined angle. That is, in the defroster mode, the rotary door 27 is rotated in maximum in the counterclockwise direction. In this case, because the circumference wall surface 27a of the rotary door 27 does not face the defroster opening 26, the defroster opening 26 is opened. Further, the face opening 25 is closed by the film member 27g of the circumference wall surface 27a of the rotary door 27, and the foot opening 24 is closed by the elastic member 27n of the second plate door portion 27j.

According to the third embodiment of the present invention, the circumference wall surface 27a of the rotary door 27 only opens and closes the face opening 25 and the defroster opening 26. Therefore, the circumference length of the circumference wall surface 27a of the rotary door 27 can be made smaller as compared with the above described first and second embodiments.

Further, the plate door portions 27i, 27j for opening and closing the foot opening 24 are disposed at the radial inner side of the circumference wall surface 27a of the rotary door 27, the foot opening 24 can be arranged an inside area of the door rotation space 29. Accordingly, the foot air passage 24a can be provided in the inside area of the door rotation space 29. As a result, the dimension of the air conditioning unit 10 in the vehicle front-rear direction can be reduced, and the air conditioning unit 10 can be readily amounted on the vehicle.

In the third embodiment, the other parts are similar to those of the above-described first embodiment, and detail explanation thereof is omitted.

(Fourth Embodiment)

Figure 10:
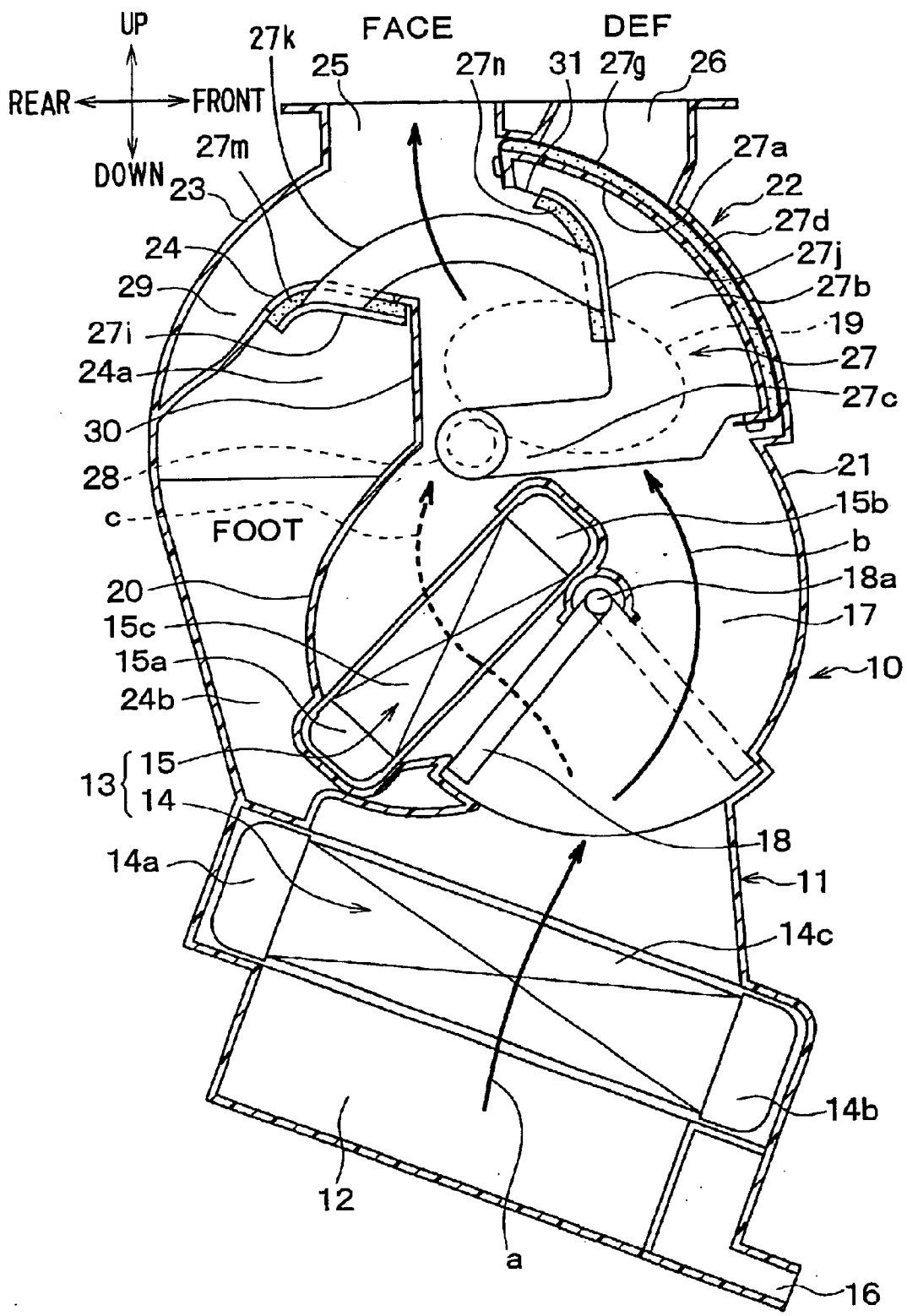
FIG. 10 is a schematic sectional view showing an air conditioning unit of a vehicle air conditioner in a face mode, according to a fourth embodiment of the present invention.

The fourth embodiment of the present invention will be described with reference to FIG. 10. In the fourth embodiment, the structure of the rotary door 27 and the structure of the foot opening 24 are similar to those of the above-described third embodiment. However, in the fourth embodiment, similarly to the above-described second embodiment of the present invention, the upper end portion of the heater core 15 is tilted to the vehicle front side. That is, in the fourth embodiment, the main feature of the second embodiment and the main feature of the third embodiment are combined. Even in this case, the advantage described in the above embodiments can be obtained.

(Fifth Embodiment)

The fifth embodiment of the present invention will be now described with reference to FIGS. 11–13. In the fifth embodiment, the face opening 25 and the defroster opening 26 are opened and closed by the circumference wall surface 27a of the rotary door 27, and the foot opening 24 is opened and closed by the side plate portions 27b.

In the fifth embodiment, the arrangement position of the foot opening 24 is changed as compared with the above-described embodiments. In the fifth embodiment, right and left foot openings 24 are provided at right and left side wall surfaces in the air conditioning case 11 of the air conditioning unit 10, on an upper side position. Therefore, the two foot openings 24 are provided to be positioned in the air conditioning case 11 at the right and left sides of the rotary door 27. In the fifth embodiment, each of the foot openings 24 is formed into an approximate trapezoid shape. However, the shape of the foot openings 24 can be changed to the other shape.

Foot communication holes 27p are provided in the right and left side plate portions 27b of the rotary door 27 to have a shape corresponding to the shape of the foot openings 24, at a radial position corresponding to the foot openings 24. Therefore, when the rotary door 27 rotates to a position at which the foot communication holes 27p communicates with the foot openings 24, the foot openings 24 are opened. When the foot openings 24 are opened by the foot communication holes 27p of the rotary door 27, conditioned air (warm air) is blown toward the foot areas of the passenger compartment at right and left seat sides through the foot openings 24.

Even in the fifth embodiment of the present invention, the outer diameter D of the rotary door 27 is made larger than the maximum passage dimension L at the upstream side of the rotary door 27. In the fifth embodiment, for example, the outer diameter D of the rotary door 27 is about 1.12 times of the maximum passage dimension L. Thus, the operation angle θ of the rotary door 27, necessary for opening and closing the openings 24–26, can be reduced to about 65°.

In the fifth embodiment, the foot openings 24 are opened and closed by the side plates 27b of the rotary door 27, and the circumference wall surface 27a only opens and closes the face opening 25 and the defroster opening 26. Specifically, the face opening 25 or the defroster opening 26 is opened when the circumference wall surface 27a of the rotary door 27 does not face the face opening 25 or the defroster opening 26. Accordingly, the circumference length of the circumference wall surface 27a of the rotary door 27 can be made smaller.

Figure 11:
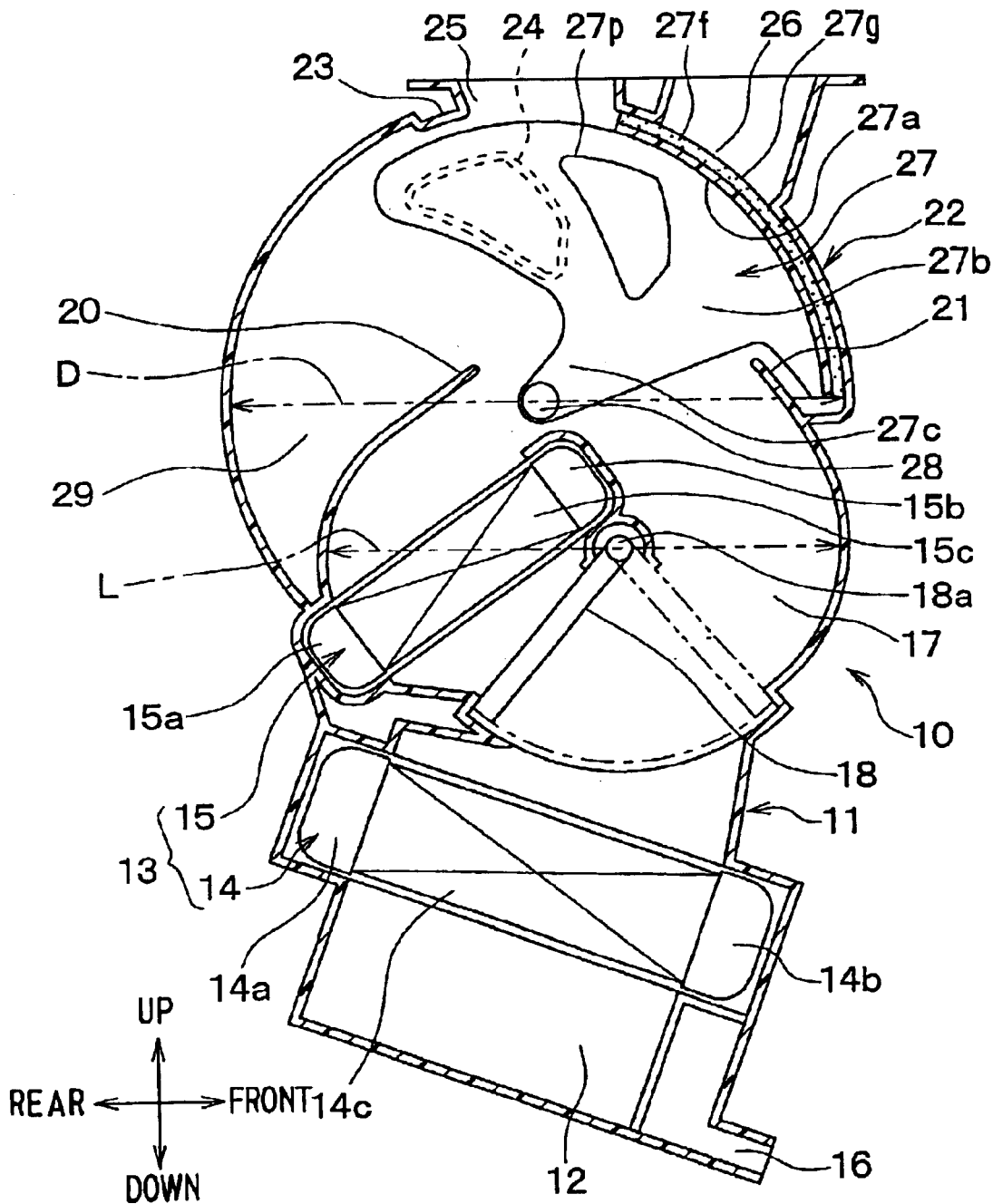
FIG. 11 is a schematic sectional view showing an air conditioning unit of a vehicle air conditioner in a face mode, according to a fifth embodiment of the present invention.

When the face mode is set as shown in FIG. 11, the defroster opening 26 is closed by the circumference wall surface 27a of the rotary door 27, and the foot openings 24 are closed by the side plate portions 27b of the rotary door 27. In this case, the circumference wall surface 27a of the rotary door 27 does not face the face opening 25, so that the face opening 25 is opened. In the fifth embodiment, an elastic seal member is attached to the side plate portions 27b on the surfaces facing the right and left side wall surfaces of the air conditioning case 11 by bonding. Therefore, the elastic seal member attached to each of the side plate portions 27b contacts each side wall surface of the air conditioning case 11 around the foot opening 24, so that it can prevent air from leaking from the foot opening 24 when the foot opening 24 is closed by the side plate portion 27b.

Figure 13:
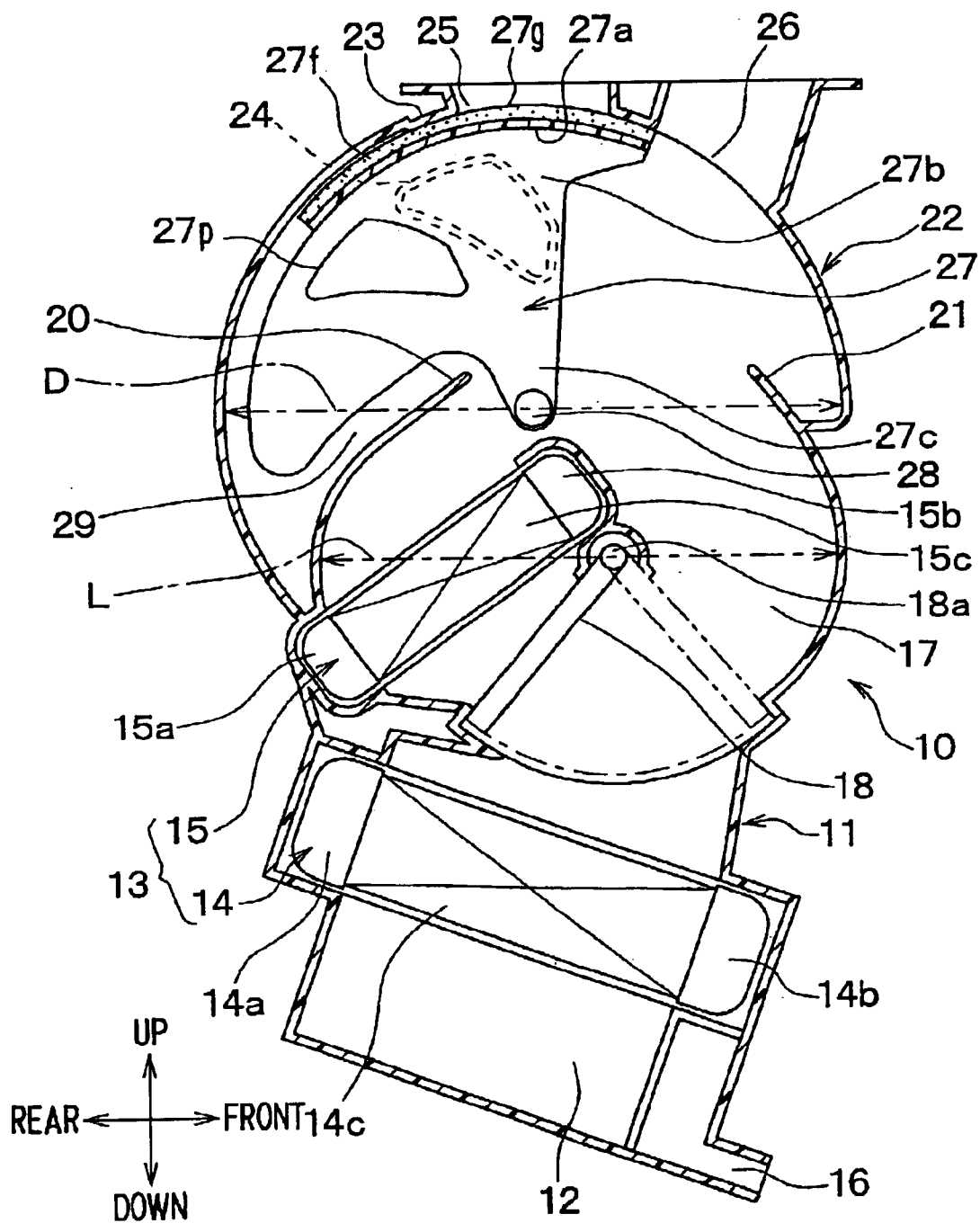
FIG. 13 is a schematic sectional view showing the air conditioning unit in a defroster mode, according to the fifth embodiment.

When the defroster mode is set as shown in FIG. 13, the face opening 25 is closed by the circumference wall surface 27a of the rotary door 27, and the foot openings 24 are closed by the side plate portions 27b. In this case, the circumference wall surface 27a of the rotary door 27 does not face the defroster opening 26, so that the defroster opening 26 is opened.

Figure 12:
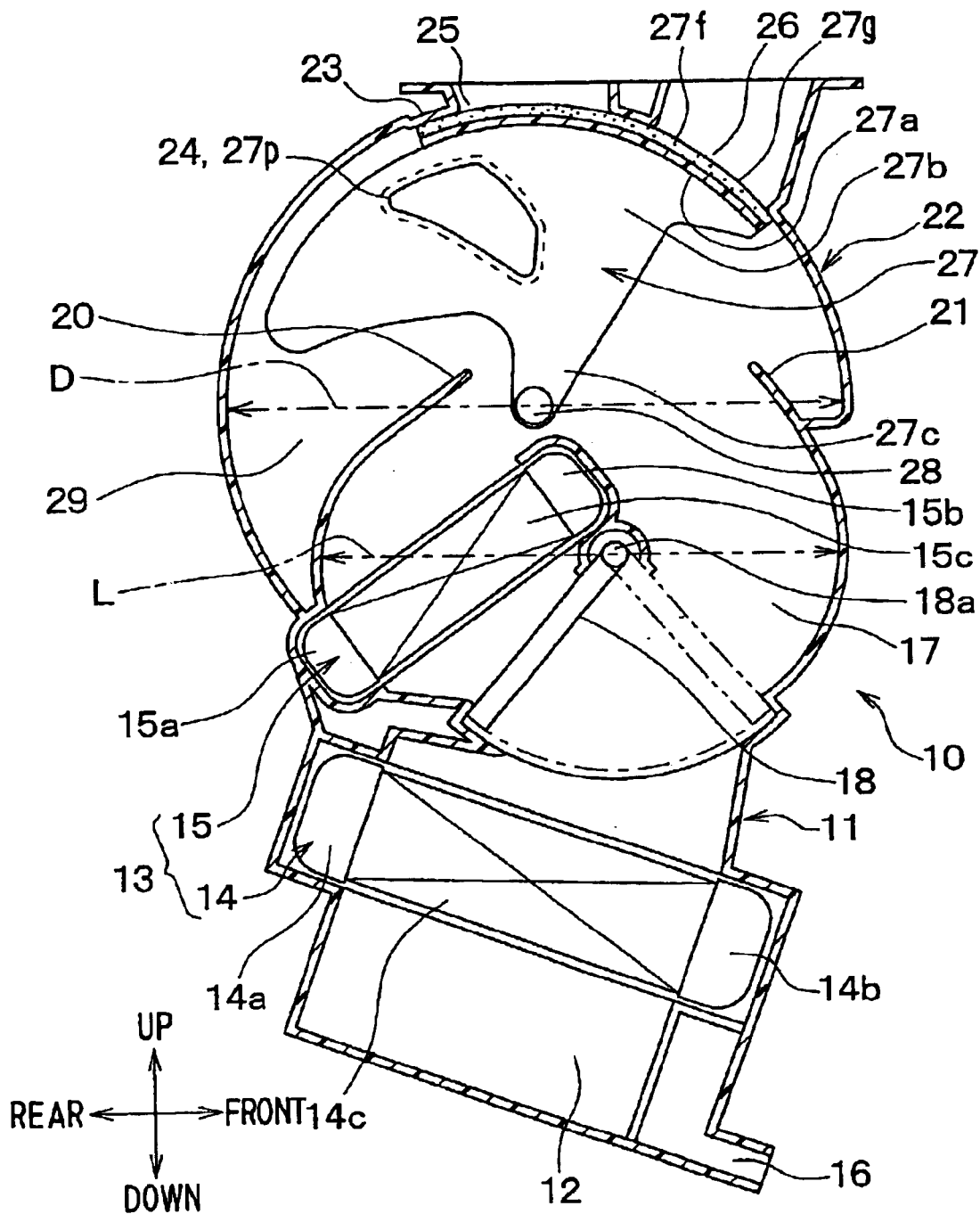
FIG. 12 is a schematic sectional view showing the air conditioning unit in a foot mode, according to the fifth embodiment.

Further, when the foot mode is set as shown in FIG. 12, the face opening 25 and the defroster opening 26 are closed by the circumference wall surface 27a of the rotary door 27, and the foot openings 24 are opened by the foot communication holes 27p of the side plate portions 27b of the rotary door 27.

Even in the fifth embodiment, when the rotary door 27 is rotated at a middle position between the position shown in FIG. 11 and the position shown in FIG. 12, the bi-level mode is set. When the rotary door 27 is rotated at a middle position between the position shown in FIG. 12 and the position shown in FIG. 13, the foot/defroster mode is set.

According to the fifth embodiment of the present invention, the foot openings 25 are provided at the right and left side wall surfaces of the air conditioning case 11 in the vehicle width direction, and are opened and closed by the rotation of the side plate portions 27b of the rotary door 27. Therefore, it is unnecessary to form the foot air passage 24a protruding to the vehicle rear side, described in the above-described first embodiment. Accordingly, the dimension of the air conditioning unit 10 in the vehicle front-rear direction can be reduced.

(Sixth Embodiment)

The sixth embodiment of the present invention will be now described with reference to FIGS. 14 and 15. In a vehicle having a navigation device, the navigation device is generally mounted in an arrangement position of the face duct connected to the face opening 25 of the air conditioning unit 10, and interference between the face duct and the navigation device may be caused. Accordingly, in the vehicle having the navigation device, for preventing the interference between the face duct and the navigation device, the arrangement position of the face opening 25 of the air conditioning unit 10 is required to be shifted to a vehicle rear side from an approximate center position in the vehicle front-rear direction, as compared with a vehicle without a navigation device. On the other hand, in the maker of the air conditioner, when the air conditioning unit 10 is designed to be different in accordance with the mounting state of the navigation device, the production cost of the air conditioning unit 10 is increased.

In view of the above-described problems, in the sixth embodiment, the arrangement position of the openings 24–26 of the air conditioning unit 10 are set to be changed, so the product cost of the air conditioning unit 10 can be restricted. FIG. 15 shows the air conditioning unit 10 of the sixth embodiment for a vehicle having a navigation device 30. FIG. 14 shows the air conditioning unit 10 of the sixth embodiment for a vehicle without the navigation device 10. In the sixth embodiment of the present invention, the heater core 15 is disposed at a lower side position of the rotation shaft 28 within the range of the outer diameter D of the rotary door 27 at a position outside the rotation locus of the rotary door 27.

Figure 14:
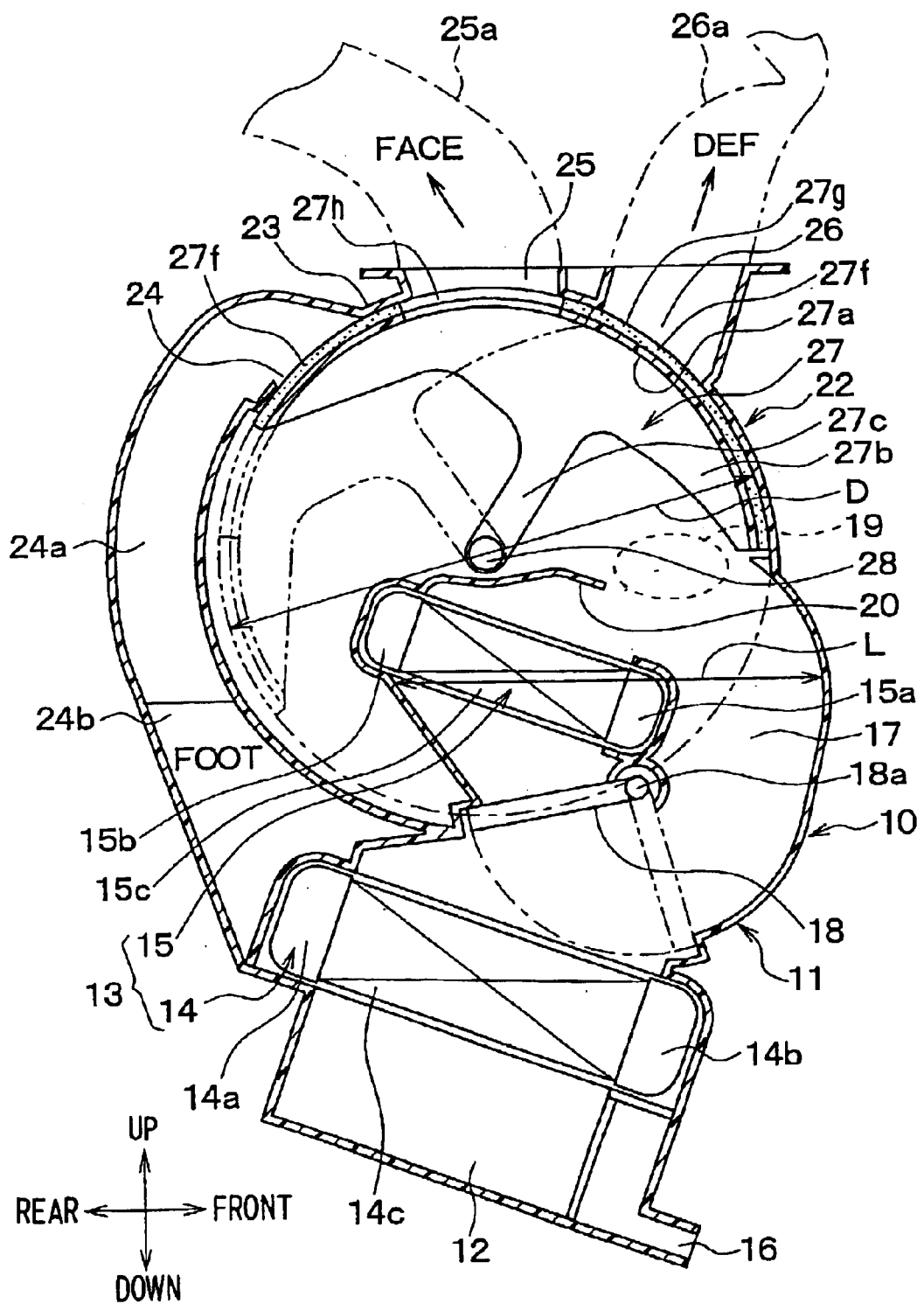
FIG. 14 is a schematic sectional view showing an air conditioning unit used for a vehicle without a navigation device, according to a sixth embodiment of the present invention.
Figure 15:
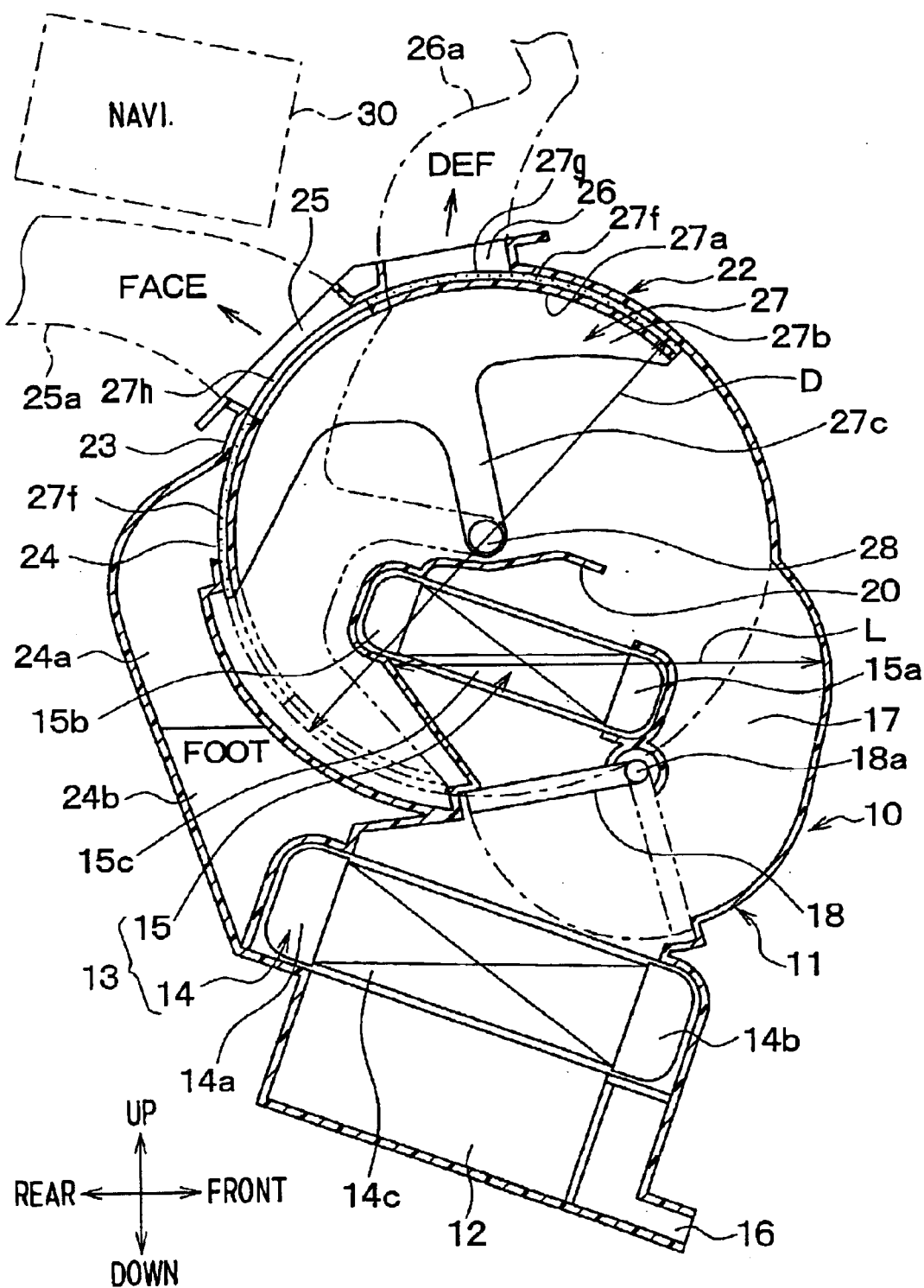
FIG. 15 is a schematic sectional view showing the air conditioning unit used for a vehicle having a navigation device, according to the sixth embodiment.

The solid line position of the rotary door 27 in FIGS. 14 and 15 is the rotation position in the face mode, where the rotary door 27 rotates most clockwise. On the other hand, the chain line position of the rotary door 27 in FIGS. 14 and 15 is the rotation position in the defroster mode, where the rotary door 27 rotates most counterclockwise. Thus, the rotary door 27 rotates between the solid line position and the chain line position in FIGS. 14, 15. A face duct 25a is connected to the face opening 25, and a defroster duct 26a is connected to the defroster opening 26.

In the sixth embodiment, because the heater core 15 is disposed at the position outside the rotation locus of the rotary door 27, the rotation operation range of the rotary door 27 can be changed even when the arrangement position of the heater core 15 can be maintained at the same state. Specifically, in FIG. 15, the rotation operation range of the rotary door 27 in the air conditioning case 11 is rotated counterclockwise by 45° relative to the position in FIG. 14. Therefore, the opening positions of the foot opening 24, the face opening 25 and the defroster opening 26 of the mode switching portion 22 in FIG. 15 are also rotated counterclockwise relative to the opening positions in FIG. 14.

Accordingly, in FIG. 15, the positions of the face opening 25 and the face duct 25a are shifted to the vehicle rear side from an approximate center position in the vehicle front-rear direction in FIG. 14. Therefore, as shown in FIG. 15, the interference between the navigation device and the face duct 25a can be prevented.

In the sixth embodiment of the present invention, the arrangement positions of the openings 24–26 of the mode switching portion 22 are changed while the other arrangement layouts of main components such as the evaporator 14, the heater core 15, the air mixing door 18 and the rotary door 27 are not changed. Therefore, the arrangement of the mode switching portion 22 can be changed while the other arrangements of the main components are used in common, thereby reducing production cost.

The heater core 15 is arranged so that the inlet and outlet tank portions 15a, 15b of the heater core 15 do not protrude outside the range of the outer diameter D of the rotary door 27, for preventing the interference between the rotary door 27 and the heater core 15. In the sixth embodiment, the cool air guide wall 21 described in the above embodiments is omitted and the cool air bypass passage 17 is provided by the air conditioning case 11.

Even in the sixth embodiment of the present invention, the outer diameter D of the rotary door 27 is set larger than the maximum passage dimension L at the upstream side of the rotary door 27 so that the size of the air conditioning unit 10 can be reduced. For example, in the sixth embodiment, the outer diameter D is approximately 1.3 times of the maximum passage dimension L (D≈L×1.3).

Although the present invention has been fully described in connection with the preferred embodiments thereof with reference to the accompanying drawings, it is to be noted that various changes and modifications will become apparent to those skilled in the art.

For example, in the above-described embodiments, the present invention is typically applied to the vehicle air conditioner where the temperature of air blown into the passenger compartment is adjusted by adjusting the flow ratio between the air amount passing through the core portion 15c of the heater core 15 and the air amount passing through the cool air bypass passage 17. However, the present invention can be applied to a vehicle air conditioner where the temperature of air blown into the passenger compartment can be adjusted by adjusting a flow amount or a temperature of hot water flowing through the heater core 15.

In the above-described embodiments of the present invention, the outer diameter D of the rotary door 27 is made larger than the maximum passage dimension L in the horizontal direction at the upstream side of the rotary door 27. According to experiments by the inventors of the present invention, even when the outer diameter D of the rotary door 27 is smaller than the maximum passage dimension L, when the outer diameter D of the rotary door 27 is equal to or larger than L×0.8, the height dimension of the air conditioning unit 10 can be effectively reduced.

In the above-described first through fifth embodiments of the present invention, the cool air guide wall 21 can be omitted by the arrangement change of the heater core 15 or the shape change of the air conditioning case 11. In this case, the cool air bypass passage 17 can be provided by the air conditioning case 11. Similarly, the warm air guide wall 20 can be omitted. Further, when the temperature of air blown into the passenger compartment is adjusted by adjusting the flow amount or the temperature of hot water flowing into the heater core 15, both the guide walls 20, 21 can be omitted.

Such changes and modifications are to be understood as being within the scope of the present invention as defined by the appended claims.

What is claimed is:

1. An air conditioner for a vehicle having a passenger compartment, the air conditioner comprising:
    an air conditioning case defining an air passage through which air flows into the passenger compartment, the air conditioning case having a plurality of opening portions through which air is blown toward different zones in the passenger compartment;
    a heat exchanging portion having at least a heating heat exchanger for heating air, the heat exchanging portion being disposed in the air conditioning case; and
    a rotary door disposed in the air conditioning case at an upper side of the heat exchanging portion to be rotated in a range of a rotation space provided in the air conditioning case, the rotary door having a circumference wall surface rotatable around a rotation shaft to open and close the opening portions; wherein:
    the rotation space is provided in the air conditioning case to extend from an upper portion of the heating heat exchanger to a side portion of the heating heat exchanger;

the circumference wall surface has a circular arc shape having two ends in a rotation direction of the rotary door; and the rotary door is disposed at an upper side of the heating heat exchanger.

2. The air conditioner according to claim 1, wherein the heating heat exchanger is arranged in the air conditioning case in a direction crossing with a horizontal surface.

3. The air conditioner according to claim 1, wherein the rotation space of the rotary door is provided to extend to a position proximate to a lower end portion of the heating heat exchanger.

4. The air conditioner according to claim 1, wherein:

the opening portions are provided adjacent to each other in a vehicle front-rear direction in an upper surface of the air conditioning case;

the rotary door is disposed to be rotated in the vehicle front-rear direction; and the rotation space is provided from the upper portion of the heating heat exchanger to a vehicle rear side portion of the heating heat exchanger.

5. The air conditioner according to claim 1, wherein the heating heat exchanger is disposed approximately vertically.

6. The air conditioner according to claim 1, wherein the heating heat exchanger is tilted in a direction between a vertical direction and a horizontal direction.

7. The air conditioner according to claim 1, wherein:

the opening portions include a foot opening through which air is blown toward a lower side in the passenger compartment, a face opening through which air is blown toward an upper side in the passenger compartment, and a defroster opening through which air is blown toward an inner surface of a windshield of the vehicle;

the rotary door further includes a plate door member disposed at a radial inner side of the circumference wall surface to be integrally rotated with the circumference wall surface; and the rotary door is disposed, such that the face opening and the defroster opening are opened and closed by the circumference wall surface, and the foot opening is opened and closed by the plate door member.

8. The air conditioner according to claim 7, wherein the plate door member is provided at a side of the circumference wall surface in a rotation direction of the rotary door.

9. An air conditioner for a vehicle having a passenger compartment, the air conditioner comprising:

an air conditioning case defining an air passage through which air flows into the passenger compartment, the air conditioning case having a plurality of opening portions through which air is blown toward different zones in the passenger compartment;

a heat exchanging portion having at least a heating heat exchanger for heating air, the heat exchanging portion being disposed in the air conditioning case; and a rotary door disposed in the air conditioning case at an upper side of the heat exchanging portion to be rotated in a range of a rotation space provided in the air conditioning case, the rotary door having a circumference wall surface rotatable around a rotation shaft to open and close the opening portions; wherein:

the rotation space is provided in the air conditioning case to extend from an upper portion of the heating heat exchanger to a side portion of the heating heat exchanger;

the opening portions include a foot opening through which air is blown toward a lower side in the passenger compartment, a face opening through which air is blown toward an upper side in the passenger compartment, and a defroster opening through which air is blown toward an inner surface of a windshield of the vehicle;

the rotary door further includes a plate door member disposed at a radial inner side of the circumference wall surface to be integrally rotated with the circumference wall surface;

the rotary door is disposed, such that the face opening and the defroster opening are opened and closed by the circumference wall surface, and the foot opening is opened and closed by the plate door member;

the rotary door further includes two side plates connected to the circumference wall surface and the rotation shaft at two end sides in an axial direction of the rotation shaft;

one end of the plate door member in a rotation direction of the rotary door has a first plate door connected to one of the side plates to be integrally rotated with the circumference wall surface and to open and close the foot opening;

the other end of the plate door member in the rotation direction of the rotary door has a second plate door for opening and closing the foot opening; and the first plate door and the second plate door are connected through a connection portion that penetrates through the foot opening.

10. The air conditioner according to claim 1, wherein:

the air conditioning case has a maximum passage dimension (L) at an upstream side of the rotary door in a direction perpendicular to an axial direction of the rotation shaft; and the rotary door has an outer diameter (D) equal to or larger than 0.8 times of the maximum passage dimension.

11. The air conditioner according to claim 1, wherein:

the air conditioning case has a maximum passage dimension (L) at an upstream side of the rotary door in a direction perpendicular to an axial direction of the rotary shaft; and the rotary door has an outer diameter (D) larger than the maximum passage dimension.

12. The air conditioner according to claim 1, wherein:

the heating heat exchanger is disposed in the air conditioning case to form a cool air bypass passage through which air bypasses the heating heat exchanger;

the air conditioning case includes a cool air guide member which guides air passing through the cool air bypass passage to an upper side of the heating heat exchanger; and the rotation shaft is disposed at a lower side of a top end of the cool air guide member.

13. The air conditioner according to claim 12, wherein:

the air conditioning case further includes a warm air guide member which guides air passing through the heating heat exchanger to an upper side of the heating heat exchanger; and the rotation shaft is disposed at a lower side of a top end of the warm air guide member.

14. The air conditioner according to claim 13, wherein:

the rotation space extends to a lower side than the top ends of the cool air guide member and the warm air guide member.

15. The air conditioner according to claim 1, wherein:

the opening portions include a foot opening through which air is blown toward a lower side in the passenger compartment, a face opening through which air is blown toward an upper side in the passenger compartment, and a defroster opening through which air is blown toward an inner surface of a windshield of the vehicle;

the rotary door further includes two side plates connected to the circumference wall surface and the rotation shaft at two end sides of the rotation shaft; and the rotary door is disposed, such that the face opening and the defroster opening are opened and closed by the circumference wall surface, and the foot opening is opened and closed by the side plates.

16. An air conditioner for a vehicle having a passenger compartment, the air conditioner comprising:

an air conditioning case defining an air passage through which air flows into the passenger compartment, the air conditioning case having a plurality of opening portions through which air is blown toward different zones in the passenger compartment;

a heat exchanging portion for performing a heat exchange with air, the heat exchanging portion being disposed in the air conditioning case; and a rotary door disposed in the air conditioning case at a downstream side of the heat exchanging portion, the rotary door having a circumference wall surface rotatable around a rotation shaft to open and close the opening portions, wherein:

the air conditioning case has a maximum passage dimension (L) at an upstream side of the rotary door in a direction perpendicular to an axial direction of the rotary shaft; and the rotary door has an outer diameter (D) equal to or larger than 0.8 times of the maximum passage dimension.

17. The air conditioner according to claim 16, wherein the outer diameter (D) of the rotary door larger than the maximum passage dimension.

18. The air conditioner according to claim 16, wherein:

the rotary door is disposed at an upper side of the heat exchanging portion;

the heat exchanging portion includes at least a heating heat exchanger for heating air; and the heating heat exchanger is disposed in the air conditioning case in a range of the outer diameter of the rotary door at a lower side position of the rotation shaft, offset from a rotation locus of the rotary door.

19. The air conditioner according to claim 16, wherein:

the rotary door is disposed at an upper side of the heat exchanging portion; and the rotation shaft is disposed adjacent to an upper end portion of the heat exchanging portion.

20. The air conditioner according to claim 16, wherein:

the heat exchanging portion includes a heating heat exchanger for heating air;

the heating heat exchanger is disposed in the air conditioning case to form a cool air bypass passage through which air bypasses the heating heat exchanger;

the air conditioning case includes a guide member which guides at least one of air passing through the cool air bypass passage to an upper side of the heating heat exchanger, and air passing through the heating heat exchanger to the upper side of the heating heat exchanger; and the rotation shaft is disposed at a lower side of a top end of the guide member.

21. An air conditioner for a vehicle having a passenger compartment, the air conditioner comprising;

an air conditioning case defining an air passage through which air flows into the passenger compartment, the air conditioning case having a plurality of opening portions through which air is blown toward different zones in the passenger compartment;

a heat exchanging portion for performing a heat exchange with air, the heat exchanging portion being disposed in the air conditioning case; and a rotary door disposed in the air conditioning case at a downstream side of the heat exchanging portion on an upper side of the heat exchanging portion, the rotary door having a circumference wall surface rotatable around a rotation shaft to open and close the opening portions, wherein:

the heat exchanging portion has a heating heat exchanger for heating air;

the heating heat exchanger is disposed in the air conditioning case to form a cool air bypass passage through which air bypasses the heating heat exchanger;

the air conditioning case includes a guide member which is disposed at an upper side of the heating heat exchange to guide at least one of air passing through the cool air bypass passage to an upper side of the heating heat exchanger, and air passing through the heating heat exchanger to the upper side of the heating heat exchanger; and the rotation shaft is disposed at a lower side of a top end of the guide member.

22. The air conditioner according to claim 21, wherein:

the opening portions are provided in an upper surface of the air conditioning case;

the air conditioning case has therein a rotation space in which the circumference wall surface is rotatable by a predetermined rotation angle; and the rotation space extends to a lower side than the top end of the guide member.

23. The air conditioner according to claim 21, wherein:

the opening portions include a foot opening through which air is blown toward a lower side in the passenger compartment, a face opening through which air is blown toward an upper side in the passenger compartment, and a defroster opening through which air is blown toward an inner surface of a windshield of the vehicle;

the rotary door further includes two side plates connected to the circumference wall surface and the rotation shaft at two end sides of the rotation shaft; and the rotary door is disposed, such that the face opening and the defroster opening are opened and closed by the circumference wall surface, and the foot opening is opened and closed by the side plates.

24. The air conditioner according to claim 1, wherein:

the rotary door further includes a plate door member disposed at a radial inner side of the circumference wall surface to be integrally rotated with the circumference wall surface;

the rotary door is disposed, such that at least a first opening among the opening portions is opened and closed by the circumference wall surface, and a second opening among the opening portions is opened and closed by the plate door member;

one end of the plate door member in the rotation direction has a first plate door integrated with the circumference wall surface to open and close the second opening;

the other end of the plate door member in the rotation direction has a second plate door for opening and closing the second opening; and the first plate door and the second plate door are connected by a connection portion that penetrates through the second opening.

25. The air conditioner according to claim 1, wherein:

the heat exchanging portion further includes a cooling heat exchanger for cooling air; and the heating heat exchanger is disposed above the cooling heat exchanger.

26. The air conditioner according to claim 1, wherein:

the rotary door further includes a plate connected to the rotation shaft and the circumference wall surface at a radial inner side of the circumference wall surface; and the plate is recessed from at least one end of the circumference wall surface in the rotation direction.

* * * * *